(12) United States Patent
Yamamoto et al.

(10) Patent No.: US 7,227,713 B2
(45) Date of Patent: Jun. 5, 2007

(54) STORAGE SYSTEM CONTROLLING POWER SUPPLY MODULE AND FAN

(75) Inventors: Akira Yamamoto, Sagamihara (JP); Takashige Iwamura, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/285,163

(22) Filed: Nov. 23, 2005

(65) Prior Publication Data

US 2006/0279869 A1    Dec. 14, 2006

(30) Foreign Application Priority Data

Jun. 8, 2005    (JP)    ............... 2005-167674
Sep. 5, 2005    (JP)    ............... 2005-255823

(51) Int. Cl.
G11B 19/02    (2006.01)
G11B 33/14    (2006.01)
G06F 1/26    (2006.01)

(52) U.S. Cl. ............... 360/69; 360/97.03; 713/320; 361/695

(58) Field of Classification Search ............... None
See application file for complete search history.

(56) References Cited

U.S. PATENT DOCUMENTS 6,583,947 B1    6/2003    Hakamata et al.
6,987,370 B2 *  1/2006    Chheda et al. ............... 318/268
7,139,170 B2 * 11/2006    Chikusa et al. ............... 361/695
2002/0162048 A1  10/2002  Ackaret et al.
2004/0054939 A1   3/2004  Guha et al.
2004/0205288 A1  10/2004  Ghaffari et al.
2004/0260967 A1  12/2004  Guha et al.
2005/0055501 A1   3/2005  Guha et al.
2005/0055601 A1   3/2005  Wilson et al.
2005/0060618 A1   3/2005  Guha
2005/0111249 A1   5/2005  Yagisawa et al.
2006/0265609 A1 * 11/2006  Fung ........................... 713/300

FOREIGN PATENT DOCUMENTS

JP    2000-149542    5/2000
JP    2000-293314    10/2000
JP    2005-157710    6/2005

* cited by examiner

Primary Examiner—Andrew L. Sniezek
(74) Attorney, Agent, or Firm—Antonelli, Terry, Stout & Kraus, LLP.

(57) ABSTRACT

When a disk device corresponding to a logical volume is started, a disk system determines and starts a disk device and a fan to be started, while comprehensively considering heat quantity generated by the disk device to be started, the cooling capacity of the fan, and the electric power consumption of the fan or the electric power consumption of the disk device.

18 Claims, 20 Drawing Sheets

FIG. 6

LOGICAL VOLUME MANAGEMENT INFORMATION

|  | ENTRY OF LOGICAL VOLUME 1141 | | ENTRY OF LOGICAL VOLUME 1142 | | ... |
|---|---|---|---|---|---|
| 6010 — LOGICAL VOLUME IDENTIFIER | 1 | | 2 | | |
| 6020 — RAID TYPE | RAID1 | | RAID1 | | |
| 6030 — DISK DEVICE NUMBER | 1 | 2 | 3 | 5 | |
| 6040 — STARTING ADDRESS | 0 | 0 | 0 | 0 | |
| 6050 — ENDING ADDRESS | 2000 | 2000 | 4000 | 4000 | |
| 6060 — CAPACITY | 1MB | | 1MB | | |
| 6070 — ACCESS FLAG | ON | | OFF | | |

DISK DEVICE MANAGEMENT INFORMATION

|  | ENTRY OF DISK DEVICE 1131 | ENTRY OF DISK DEVICE 1132 | ENTRY OF DISK DEVICE 1133 | ... |
|---|---|---|---|---|
| 7010 — DISK DEVICE IDENTIFIER | 1 | 2 | 3 | |
| 7020 — PHYSICAL CAPACITY | 1GB | 500MB | 200MB | |
| 7030 — ELECTRIC POWER CONSUMPTION | 30W | 30W | 24W | |
| 7040 — CALORIFIC POWER | 28W | 28W | 20W | |
| 7050 — IN-OPERATION FLAG | Yes | Yes | No | |
| 7060 — TEMPERATURE | 60 | 50 | 40 | |

POWER SUPPLY MODULE INFORMATION

|  | ENTRY OF POWER SUPPLY MODULE 1161 | ENTRY OF POWER SUPPLY MODULE 1162 | ... |
|---|---|---|---|
| 8010 — POWER SUPPLY MODULE IDENTIFIER | 1 | 2 | |
| 8020 — ELECTRIC POWER CAPACITY | 100W | 100W | |
| 8030 — CONNECTION INFORMATION | DISK DEVICE: 1, 3, 5, 7 FAN: 1, 3 | DISK DEVICE: 2, 4, 6, 8 FAN: 2, 4 | |

FAN INFORMATION

| | ENTRY OF FAN 1151 | ENTRY OF FAN 1152 | ... |
|---|---|---|---|
| FAN IDENTIFIER | 1 | 2 | |
| COOLING HEAT QUANTITY | 40W | 40W | |
| ELECTRIC POWER CONSUMPTION OF FAN | 5W | 5W | |
| TURN-ON FLAG | ON | OFF | |
| PART INFORMATION | DISK DEVICE 1, 2, 3, 4 | DISK DEVICE 5, 6, 7, 8 | |

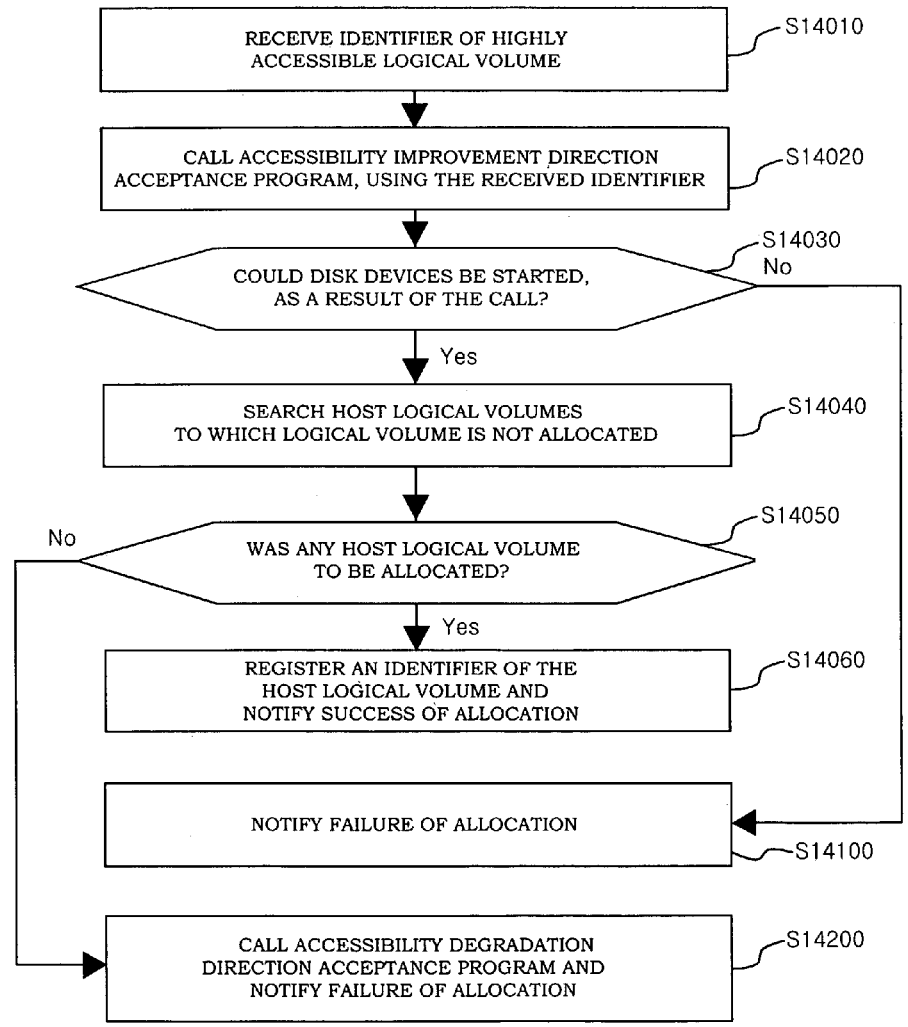

LOGICAL VOLUME COUNTER INFORMATION

|  | ENTRY OF LOGICAL VOLUME 1 | ENTRY OF LOGICAL VOLUME 2 |  |
|---|---|---|---|
| LOGICAL VOLUME IDENTIFIER | 1 | 2 |  |
| OPEN COUNTER | 11 | 120 |  |
| MOUNT COUNTER | 0 | 2 |  |

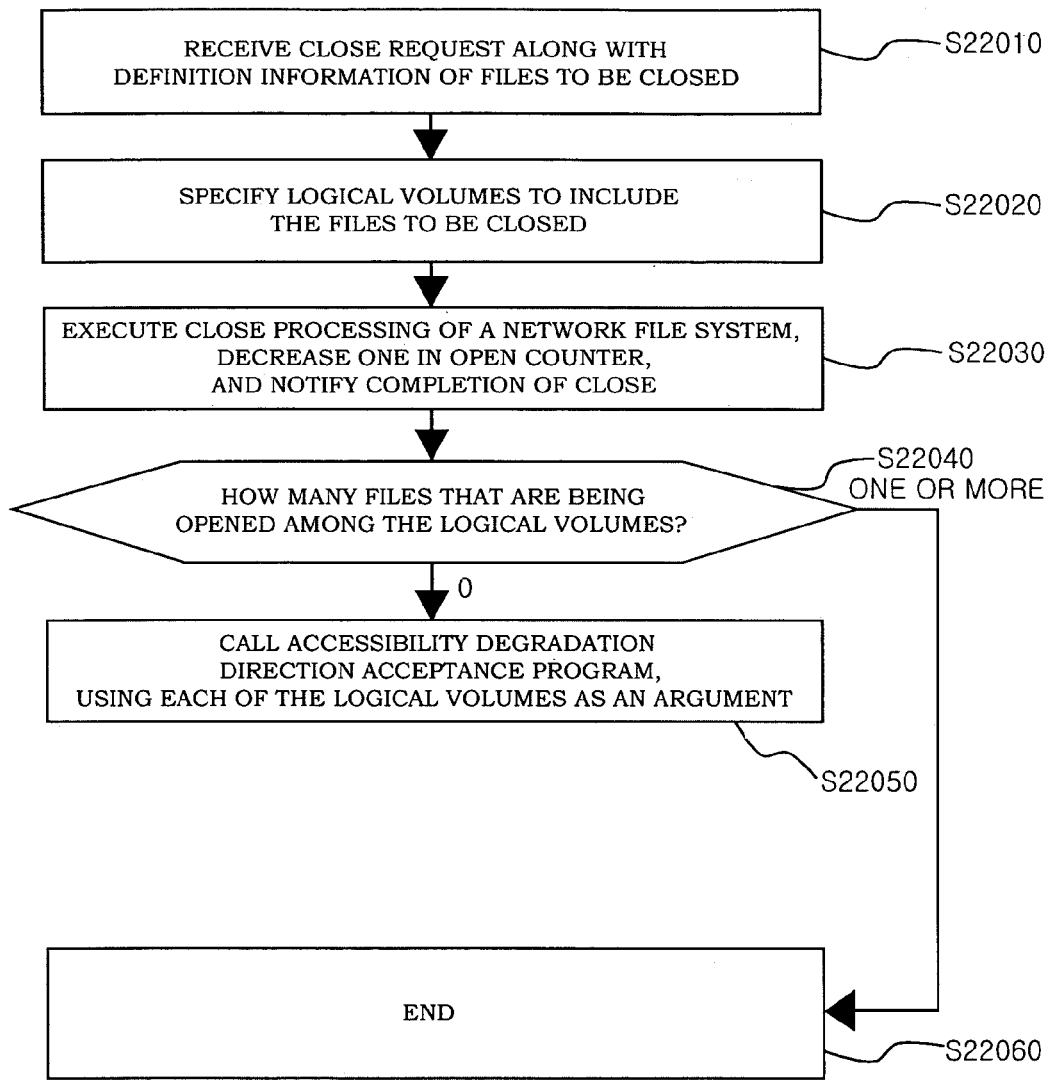

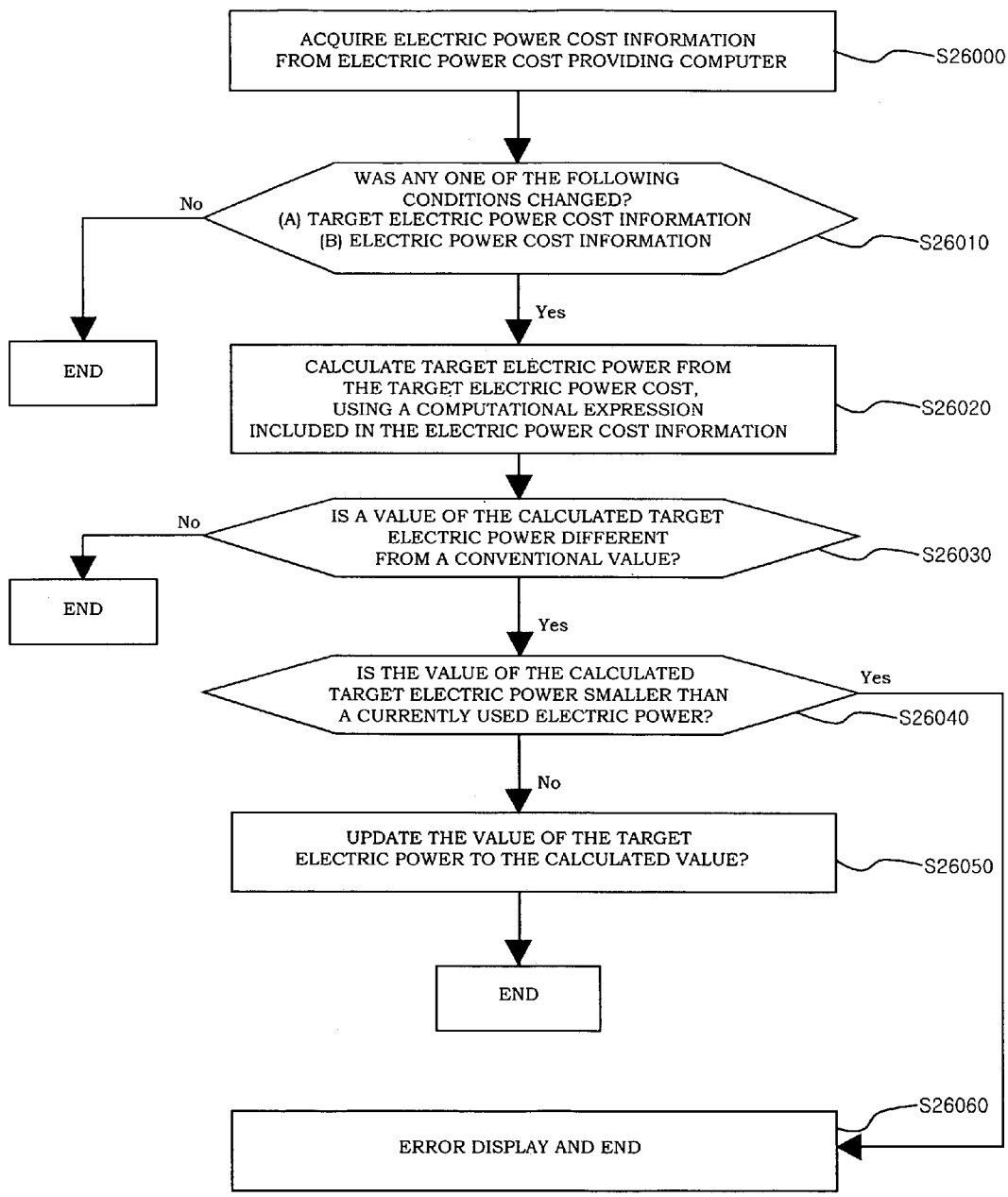

STORAGE SYSTEM CONTROLLING POWER SUPPLY MODULE AND FAN

This application relates to and claims priority from Japanese Patent Application No. 2005-255823, filed on 5 Sep. 2005, the entire disclosure of which is incorporated herein by reference.

BACKGROUND OF THE INVENTION

1. Field of the Invention

The present invention relates to an art of realizing a storage system of low cost, long life span, low electric power consumption.

2. Description of the Related Art

In recent years, the amount of information held by enterprises has increased and the inventory of storage systems, such as disk arrays, to store the information has also increased. Therefore, information system managers of the enterprises need to manage a large number of storage systems. Thus, a movement to put together a larger number of storage systems into a large-scale storage system is brisk. If the large-scale storage system is run, it is necessary to consider a reduction in the electric power consumption of the storage system and cooling of heat generated.

JP-A Nos. 2000-293314 and 2005-157710 disclose a technique of allowing disk devices to transit to a power saving mode or turning off power supply modules of the disk devises, in order to save energy consumed by the disk devices.

Meanwhile, JP-A No. 2000-149542 discloses a technique of changing the number of rotations of fans in the storage system to appropriately cool the storage system, in conjunction with the structure of the storage system.

SUMMARY OF THE INVENTION

Since a cooling device (for example, a fan, hereinafter referred to as "fan") used for cooling the storage system also consumes electric power in actuality, it is necessary to consider the electric power consumption of the fan when a reduction in the electric power consumption of the storage system is taken into consideration. However, if the fan is not appropriately operated, the storage system cannot be cooled well, and in the worst case, there is a possibility that the data stored in the storage system may be destructed. In other words, it is necessary to control the electric power consumption and the cooling capacity of the storage system in correlation with each other.

However, JP-A Nos. 2000-293314 and 2005-157710 do not consider the cooling, and the JP-A No. 2000-149542 does not consider the electric power consumption at all.

In the present specification, as a configuration in which the electric power consumption of the storage system is reduced while the cooling capacity thereof is maintained, the following configuration is disclosed. That is, in a storage including a controller, a disk device connected to the controller, a cooling device that cools the disk device, and a power supply module that supplies electric power to the controller, the disk device, and the cooling device, the controller determines whether or not the disk device is to be started, on the basis of information concerning heat quantity generated by starting the disk device, the cooling capacity of the cooling device, and electric power required to drive the disk device.

As another aspect, it is also conceivable to adopt a configuration in which the controller creates a logical volume on the basis of a storage region in the disk device, and the controller determines whether or not the disk device is to be started or stopped, using information on whether or not the logical volume is to be used from other devices as a trigger.

Moreover, as still another aspect, it is conceivable to adopt a configuration in which the controller further determines whether or not the cooling device is to be run. Other aspects of the invention will become apparent from the following description with reference to the accompanying drawings.

According to the invention, it is possible to reduce the electric power consumption of the storage system, to reduce the cost of the power supply module and the fan, and to prolong the life span of the devices.

BRIEF DESCRIPTION OF THE DRAWINGS

FIG. 6 shows an exemplary configuration of logical volume management information;

FIG. 7 shows an exemplary configuration of disk device management information;

FIG. 8 shows an exemplary configuration of power supply module information;

FIG. 9 shows an exemplary configuration of fan information;

FIG. 13 shows an exemplary configuration of host logical volume information;

FIG. 14 shows an exemplary processing sequence when a disk system 12000 has received a host logical volume allocation request;

FIG. 22 shows an exemplary processing sequence when the NAS 16100 has accepted a file close request;

FIG. 23 shows an exemplary configuration of disk system information;

FIG. 26 shows an exemplary processing sequence of a management computer 1300.

DESCRIPTION OF THE PREFERRED EMBODIMENTS

Hereinafter, preferred embodiments will be described. It should be noted here that all the embodiments are described only for the illustrative purpose, and the invention is not limited to the embodiments.

Further, it is assumed in the following description of the embodiments that the "starting of a disk device" means that a disk device transits from a certain state to a state in which the disk device can process a read/write request from another device (for example, a control device). Here, the "state in which a disk device can process a read/write request" indicates, for example, a state in which a power supply module of a controller in the disk device is turned on, and a recording medium (a disk (also referred to as a platter)) in the disk device has rotated.

Moreover, it is assumed that the "stopping of a disk device" means that the disk device transits from a started state to a state in which the electric power consumption thereof is smaller than that of the started disk device. Here, the "stopped state" is, for example, a state in which the rotation of a platter has been stopped, a state in which a controller in a disk device is turned off or become a power-saving mode, or the like.

Figure 1:
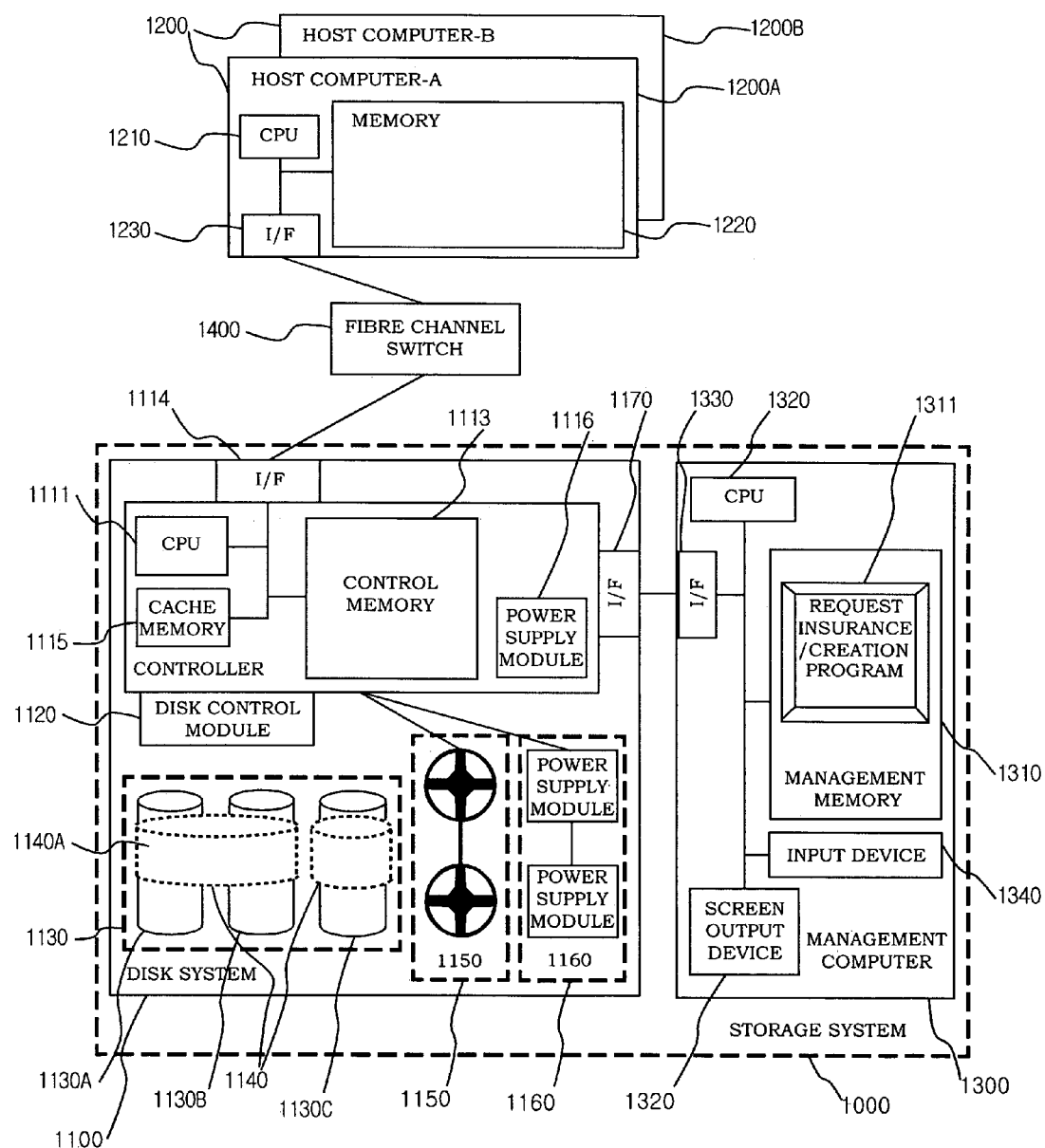
FIG. 1 shows an exemplary configuration of a system in a first embodiment.

FIG. 1 shows an exemplary configuration of a system to which a first embodiment is applied. The system has a host computer 1200, a storage system 1000, and a fibre channel switch 1400 that connects the host computer 1200 with the storage system 1000. It should be noted that the device for connecting the host computer 1200 with the storage system 1000 may be, for example, any device, such as an IP (Internet Protocol) switch and a connecting device for a main frame, other than the fibre channel switch 1400.

Further, the number of host computers 1200 to be connected to the storage system 1000 may be one or more. FIG. 1 shows an example of two host computers 1200, which are referred to as a host computer 1200A and a host computer 1200B, respectively. The host computer 1200 is a general computer, and has a CPU 1210, a memory 1220, and a disk interface 1230 for connection with the fibre channel switch 1400.

The storage system 1000 has a disk system 1100 and a management computer 1300. The disk system 1100 and the management computer 1300 are connected to each other over a network. In addition, it is also conceivable that the management computer 1300 is mounted within one housing as a management part within the disk system 1100.

The disk system 1100 has a controller 1110, a disk device 1130, a power supply module 1160, and fan 1150. The controller 1110 has an host interface 1114 connected to the fibre channel switch 1400, a disk control module 1120 that controls the disk device 1130, a cash memory 1115, a processor 1111, a control information memory 1113, a management interface 1170 that is an interface with the management computer 1300, and a controller power supply module 1116.

The disk system 1100 has one or more disk device 1130. FIG. 1 shows an example in which the disk system 1100 has three disk devices 1130, specifically, a disk device 1130A, a disk device 1130B, and a disk device 1130C. In addition, it is assumed in the following description that a disk device 1130, which is not accessed for a predetermined period of time, stops its own operation (rotation of a disk, movement of a head, etc.) on the basis of control of the disk system 110O or on the basis of control of the disk device 1130 itself.

The disk system 1100 provides the host computer 1200 with a logical volume 1140 as an virtually (or logical) storage device. The logical volume 1140 and the disk device 1130 may be or may not be in a one-to-one correspondence with each other. For example, one logical volume 1140 may be defined over a plurality of disk devices 1130. One or more logical volume 1140 is included in the disk system 1100. FIG. 1 shows an example in which the disk system 1100 has a logical volume 1140A and a logical volume 1140B. Further, in the disk system 1100, a plurality of disk devices 1130 are defined as a set having a redundant configuration, such as RAID. Also, all or some of storage regions in the disk device 1130 included in the set may be defined as the logical volume 1140. Thereby, even when the disk device 1130 included in the set fails to operate properly, it is possible to prevent the contents of data stored in the logical volume 1140 from being lost.

The power supply module 1160 is used to drive parts within the disk system 1100, principally, within the disk device 1130 and the fan 1150. In the present embodiment, the disk system 1100 has a plurality of a power supply modules 1160. In each power supply module 1160, a part taking care of electric power supply is specified. The fan 1150 is a device that cools the interior of the disk system 1100. In the present embodiment, the disk system 1100 has a plurality of fans 1150. For every fan 1150, a part (mainly, the disk device 1130) or a region in the device to be cooled is specified. The controller power supply module 1116 is a power supply module for a part included in the controller 1110.

A portion of data stored in the logical volume 1140 is temporarily stored in the cash memory 1115 (also referred to as "cash 1115"). Management data, etc. of the disk system 1100 is stored in the control memory 1113. The cash 1115 and the control memory 1113 may be a volatile memory or a nonvolatile memory (for example, a flash memory). Further, the cash 1115 and the control memory 1113 may have redundancy in order, such as double-up. Programs and information included in the control memory will be described below.

The management computer 1300 is a general computer, and has a CPU 1320, a management memory 1310, a storage system interface 1330, a user input device 1340 (for example, a keyboard, a mouse, etc.), a screen output device (for example, there is a display device. In addition, it may be a program that transmits screen output to other computers). A request issuance/creation program 1311 is stored in the management memory 1310. In addition, the request issuance/creation program 1311 is a program that is executed by the CPU 1320 when the management computer 1300 transmits to the disk system 1100 the information indicating that the possibility of a certain logical volume 1140 to be accessed (that is, the possibility that data stored in the logical volume 1140 is used by a user) has been raised or lowered. In addition, the request issuance/creation program may be stored in, for example, a memory in the host computer 1200 other than the management computer 1300. In this case, the host computer 1200 transmits the information to the disk system 1100 (or the storage system 1000).

Figure 2:
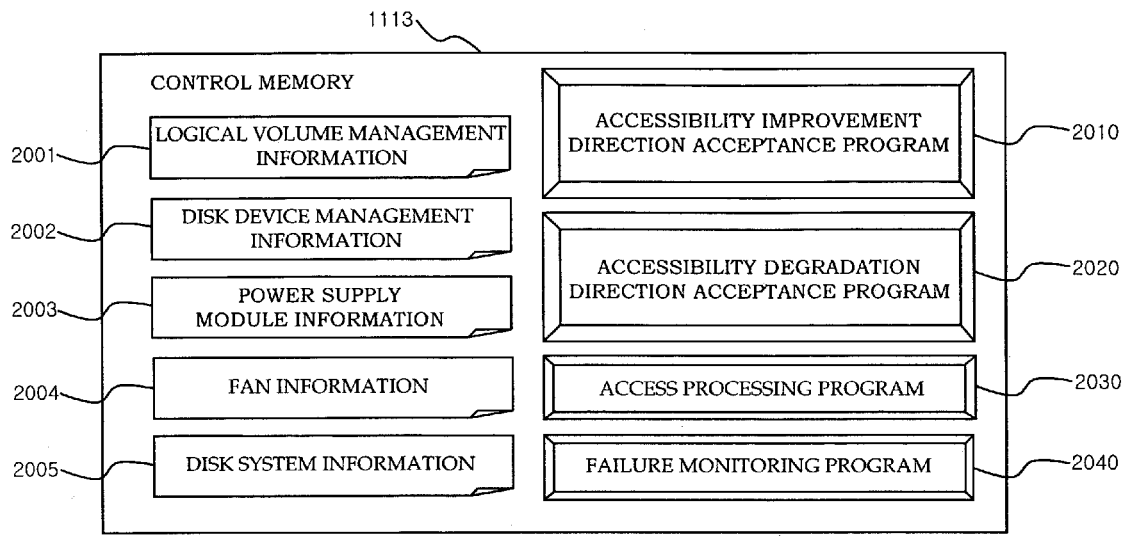
FIG. 2 shows an example of information and programs in a control memory.

FIG. 2 shows an example of information and programs included in the control memory 1113. The programs included in the control program 1113 are executed by the CPU 1111. In addition, as another form, it is also conceivable that dedicated hardware is substituted for a processor in some or all of the processing realized by a program and a processor.

Logical volume management information 2001 is information for managing the logical volume 1140 included in the disk system 1100. Specifically, the logical volume management information 2001 includes the information concerning the corresponding relation between the logical volume 1140 and the disk device 1130. The disk system 1100 makes an exchange of addresses between the logical volume 1140 and the disk device 1130. Disk device management information 2002 is information for managing the disk device 1130. Specifically, the disk device management information 2002 includes information concerning operation and information concerning electric power consumption, of each disk device 1130 included in the disk system 1100.

Power supply module information 2003 is information for managing the power supply module 1160. Specifically, the power supply module information 2003 includes information concerning a maximum electric power that can be supplied by the power supply module 1160 in the disk system 1100 and information concerning parts to which the power supply module 1160 supplies electric power. Fan information 2004 is information for managing the fan 1150 in the disk system 1100. Specifically, the fan information 2004 includes information concerning the cooling capacity of the fan 1150, and information concerning parts to be cooled by the fan 1150. Disk system information 2005 includes information for managing target values of resources consumed by the disk system 1100 or wastes thereof.

(Rock: OK)

An accessibility improvement direction acceptance program is a program executed by the CPU 1111 when the disk system 1100 performs starting of parts including a fan 1150 and a disk device 1130 according to need, on the basis of the information that the accessibility to a logical volume 1140 is raised. An accessibility degradation direction acceptance program is a program executed by the CPU 1111 when the disk system 1100 recognizes and stops parts including a fan 1150 and a disk device 1130 which can be stopped, on the basis of the information that the accessibility to a logical volume 1140 is lowered.

An access processing program 2030 is a program executed by the CPU 1111 when the disk system 1100 recognizes a disk device 1130 by using the logical volume management information 2001 and performs data transmission to the disk device 1130, according to a read request or a write request to the logical volume 1140 from the host computer 1200. The access processing program is also executed by the CPU 1111 even when the disk system 1100 moves the data stored in the logical volume 1140 according to a request from the management computer 1300. Moreover, the access processing program 2030 is executed by the CPU 1111 even when the disk system 1100 executes mirroring processing required to make a plurality of disk devices 1130 a parity group that is a RAID configuration, executes computation of redundant information, or executes data recovery processing when some of disk devices 1130 included in the parity group are damaged.

A failure monitoring program 2040 is a program executed by the CPU 1111 when the disk system 1100 monitors a failure occurrence situation or state (temperature, etc, inside the devices) of a part within the disk system. The disk system 1100 executes the failure processing program periodically or at a specific time (for example, before execution of specific processing (data copy or data movement)). If a change in the state of a part is discovered, the disk system 1100 changes, according to the change in the state, values of the logical volume management information 2001, the disk device management information 2002 (particularly, electric power consumption 7030, calorific power 7040, an in-operation flag 7050, and temperature 7060, which will be described below), the power supply module information 2003 (particularly, electric power capacity 8020, which will be described below), and the fan information 2004 (particularly, cooling heat quantity 9020 or electric power consumption 9030 of a fan, which will be described below).

Figure 3:
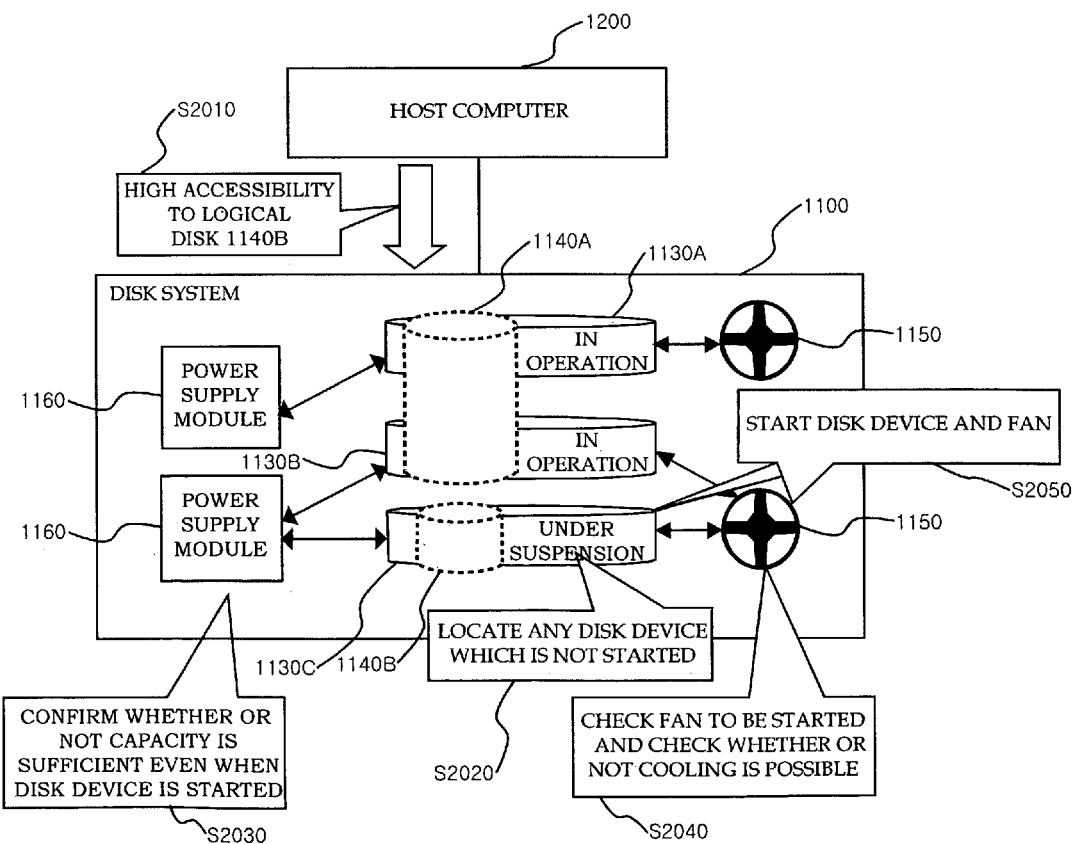
FIG. 3 shows the outline of operation of the first embodiment.
Figure 4:
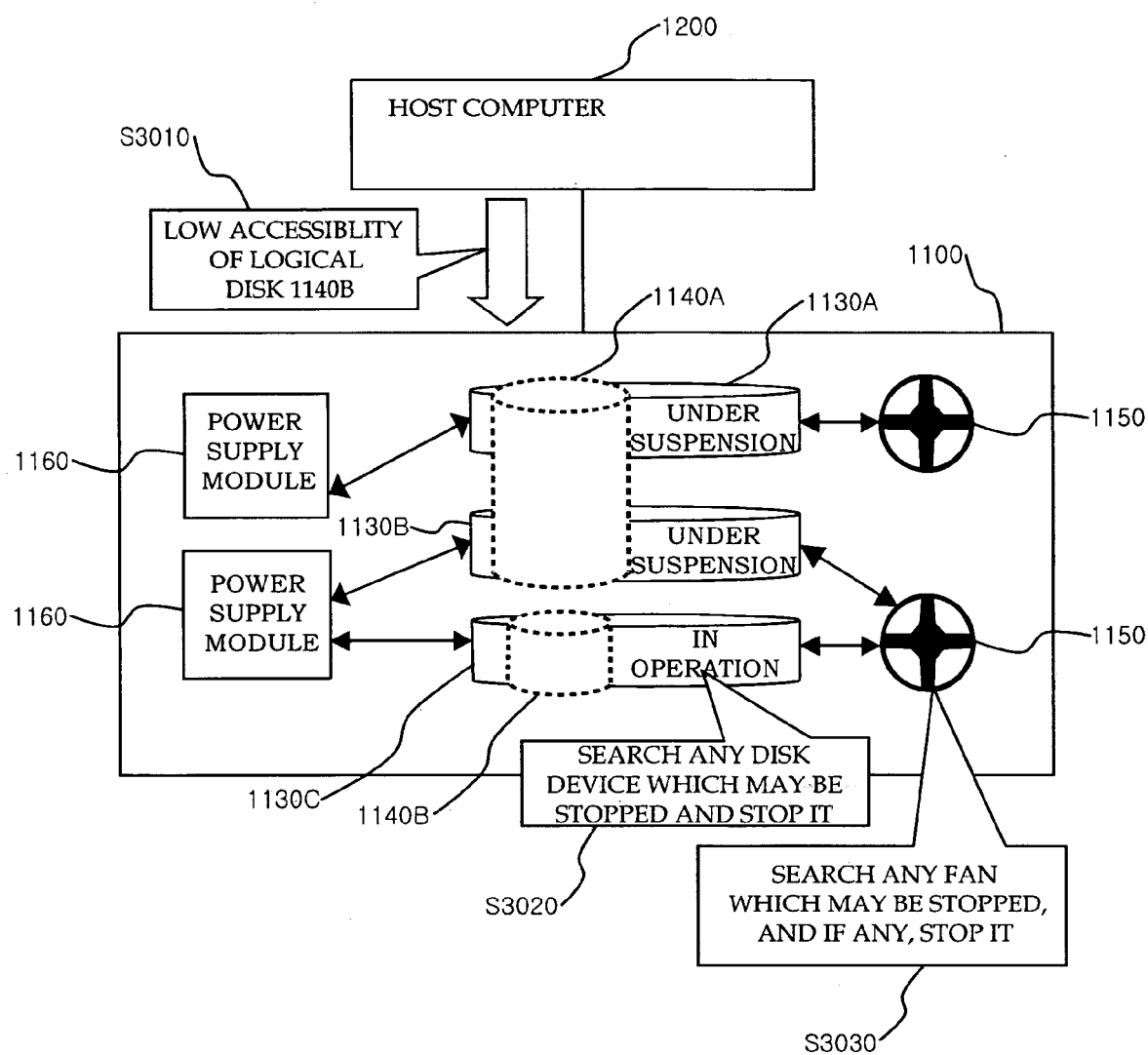
FIG. 4 shows the outline of operation of the first embodiment.

FIGS. 3 and 4 show the outline of operation of the first embodiment. FIG. 3 shows the outline when the host computer 1200 (or the management computer 1300) indicates a logical volume 1140 whose the possibility to be accessed (accessibility) in the future has been raised among logical volumes 1140 defined in the disk system 1100, to the storage system 1000 (or the disk system 1100).

First, the disk system 1100 receives a request including the information concerning logical volumes 1140 to which the accessibility has been raised, from the host computer 1200 (or the management computer 1300) (S2010) The controller 1110 of the disk system 1100 specifies all disk devices 1130 corresponding to the logical volumes 1140 designated in the received information. Then, the controller 1110 confirms whether or not there is any disk device 1130 that has not been started among the specified disk devices 1130 (S2020). If all the disk devices have been started, the controller 1110 completes the processing, and reports the completion to the host computer 1200 (or the management computer 1300).

If there is any disk device 1130 which has not been started, the controller 1110 confirms whether or not the capacity of the electric power module 1160 is sufficient even if the disk device 1130 which have not been started are started (S2030). Further, the controller 1110 confirms whether or not there is any fan 1150 to be started by the starting of the disk device 1130. Moreover, the controller 1110 confirms whether or not sufficient cooling is possible from the viewpoint of the performance of the fan 1150 to be started (S2040) If needed, the controller 1110 also determines other conditions. If the conditions are satisfied, the controller 1110 performs starting of a required disk device 1130 and a fan 1150, and reports completion of the processing to the host computer 1200 (or the management computer 1300) (S2050). By doing so, in the present embodiment, the fan 1150 can be started simultaneously with start of generation of heat caused by the starting by the disk device 1130. Therefore, rapid cooling becomes possible. Also, since the fan 1150 is not unnecessarily driven, the electric power consumption can be reduced.

FIG. 4 shows the outline when the host computer 1200 (or the management computer 1300) indicates logical volumes 1140 whose possibility to be accessed (accessibility) in the future have been lowered among logical volumes 1140 defined in the disk system 1100, to the storage system 1000 (or the disk system 1100).

First, the disk system 1100 receives a request including the information concerning logical volumes 1140 to which the accessibility has been lowered, from the host computer 1200 (or the management computer 1300) (S3010). The controller 1110 of the disk system 1100 specifies all disk devices 1130 defined by the logical volumes 1140 designated in the received information. Next, the controller 1110 searches whether or not there is any disk device 1130 which may be stopped among the specified disk devices 1130, as the accessibility of the designated logical volumes 1140 is lowered. If there is no disk device 1130 which may be stopped, the controller 1110 completes the processing, and reports the completion to the host computer 1200 (or the management computer 1300).

If there is any disk device 1130 which may be stopped, the controller 1110 stops the disk device 1130. After that, the controller 1110 notifies the host computer 1200 of the completion of the processing (S3020). Next, the controller 1110 confirms whether or not there is any fan 1150 that may be stopped, as the disk device 1130 is stopped, and if any, stops the fan (S3030). In this way, in the present embodiment, the disk device 1130 for which starting is unnecessary is stopped, so that the calorific power can be lowered and the fan 1150 can be stopped simultaneously. Therefore, unnecessary electric power can be reduced and the volume of operation sound of the fan can be decreased.

Figure 5:
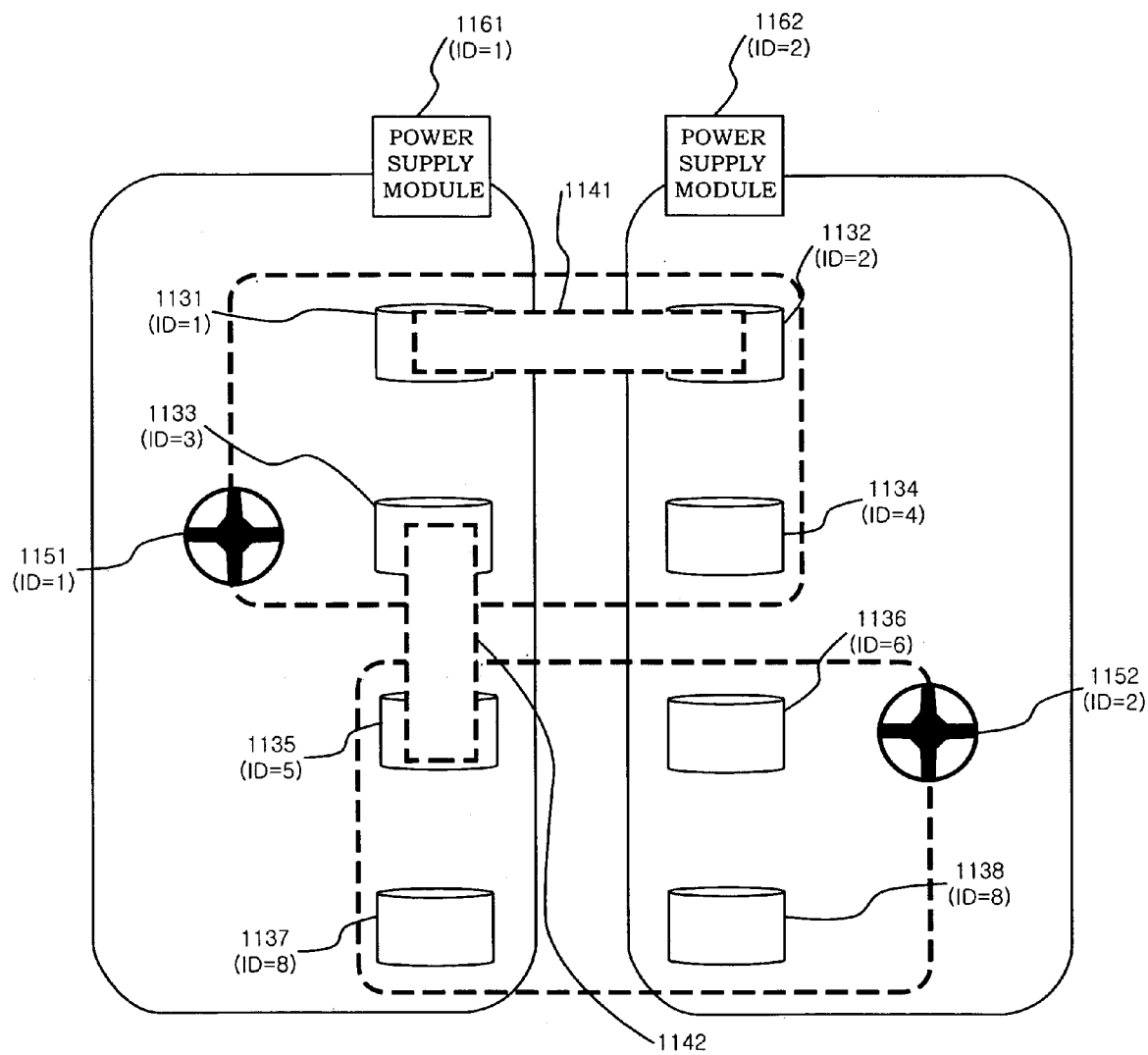
FIG. 5 illustrates the relationship among a power supply module, a fan, a disk device, and a logical volume inside the disk system.

Hereinafter, the first embodiment will be described in detail referring to FIG. 5. FIG. 5 shows an example of the system in FIG. 1. In this figure, only the elements necessary for explaining the system in detail are extracted.

In FIG. 5, it is assumed that the disk system 1100 has two power supply modules 1161 and 1162, two fans 1151 and 1152, and eight disk devices 1131, 1132, 1133, 1134, 1135, 1136, 1137 and 1138. In addition, numbers after the "ID=" in parentheses in FIG. 5 represent identifiers allocated to respective parts.

The power supply module 1161 supplies electric power to the fan 1151, the disk device 1131, the disk device 1133, the disk device 1135, and the disk device 1137. The power supply module 1162 supplies electric power to the fan 1152, the disk device 1132, the disk device 1134, the disk device 1136, and the disk device 1138. The fan 1151 cools the disk device 1131, the disk device 1132, the disk device 1133, and the disk device 1134. The fan 1152 cools the disk device 1135, the disk device 1136, the disk device 1137, and the disk device 1138.

The logical volume 1141 is composed of all or some data regions of the disk devices 1131 and 1132. The logical volume 1142 is composed of all or some data regions of the disk devices 1133 and 1135.

FIG. 6 shows an exemplary configuration of the logical volume management information 2001 in the configuration shown in FIG. 5. The logical volume management information 2001 has entries shown below for every logical volume 1140 (specifically, logical volumes 1141 and 1142 in FIG. 5).

A logical volume identifier 6010 is an entry with which information concerning an identifier given to the logical volume 1140 is registered. A RAID type 6020 is an entry with which information representing a redundant configuration (for example, RAID 5 or RAID 1) of the disk device 1130 corresponding to the logical volume 1140 is registered. A disk device number 6030, a starting address 6040, and an ending address 6050 are entries with which information concerning the number of the disk device 1130 corresponding to the logical volume 1140, and information concerning starting addresses and ending addresses that store data are registered. If the logical volume 1140 is defined based on a plurality of disk devices 1130, it is natural that respective entries of a disk device number 413, a starting address 414, and an ending address 415 are prepared by the number of corresponding disk devices 1130.

Capacity 6060 is an entry with which information concerning storage capacity as seen from the host computer 1200 of the logical volume 1140 is registered. An access flag 6070 is an entry with which information of the accessibility to the logical volume 1140 is registered. In the present embodiment, it is assumed that, when an entry of the access flag 6070 is turned on, the accessibility to a corresponding logical volume 1140 is being raised.

Regarding information concerning the entries other than the entry 6070, when a logical volume 1140 is set in the disk system 1100, the information is set in the entries for every logical volume 1140. The controller 1110 of the disk system 1100 performs the setting of the logical volume on the basis of a direction (the capacity of the logical volume, etc.) of the management computer 1300. At the time of the setting of the logical volume 1140, the controller 1110 registers information in the logical volume management information 2001 in conjunction with the setting. In addition, for the entry 6070, the controller 1110 registers a flag when information has been received from the host computer 1200 (or the management computer 1300).

FIG. 7 shows an exemplary configuration of the disk device management information 2002 in the configuration shown in FIG. 5. The disk device management information 2002 has entries that register information shown below for every disk device 1130 (specifically, disk devices 1131, 1132, 1133, 1134, 1135, 1136, 1136, 1137, and 1138 in FIG. 5).

A disk device identifier 7010 is an entry with which information concerning an identifier of the disk device 1130 is registered. Physical capacity 7020 is an entry with which information concerning the storage capacity of the disk device 1130 is registered. Electric power consumption 7030 is an entry with which information concerning the electric power consumption of the disk device 1130 is registered. Calorific power 7040 is an entry with which information concerning the calorific power of the disk device 1130 is registered. An in-operation flag 7050 is an entry with which information indicating whether or not any disk device 1130 is in operation is registered. Temperature 7060 is an entry with which information concerning the temperature of the disk device 1130 is registered.

Among these entries, the information other than the entry 7060 may be set in advance at the time of factory shipment. This is because it is convenient that information concerning the specification of the disk device 1130 is set by a vendor. It should be noted here that these kinds of information may be input from the management computer 1300, etc. If any new disk device 1130 is added, the entry information concerning the disk device 1130 to be added is registered from the management computer 1300, etc.

In addition, it is conceivable that the temperature 7060 is set by placing a thermometer in the disk device 1130, and making the disk system 1100 execute the failure monitoring program 2040 to confirm output of the thermometer periodically. However, the measurement of the temperature of the disk device 1130 and the setting of the information may be performed by any other methods.

FIG. 8 shows an exemplary configuration of the electric power module information 2003 in the configuration shown in FIG. 5. The electric power module information 2003 has entries that register the following information for every electric power module 1160 (specifically, electric power modules 1161 and 1162 in FIG. 5). An electric power identifier 8010 is an entry with which information concerning an identifier of the electric power module 1160 is registered. An electric power capacity 8020 is an entry with which information concerning the electric power capacity of the electric power module 1160 is registered. Connection information 8030 is an entry with which information concerning an identifier of a part connected to a corresponding electric power module 1160 is registered. If a plurality of parts are connected, information concerning identifiers as much as the number of the parts will be registered. Typical parts are the disk device 1130 and the fan 1150.

FIG. 9 shows an exemplary configuration of the fan information 2004 in the configuration shown in FIG. 5. The fan information 2004 has entries that register the following information for every fan 1150 (specifically, fans 1151 and 1152 in FIG. 5). A fan identifier 9010 is an entry with which information concerning an identifier of the fan 1150 is registered. Cooling heat quantity 9020 is an entry with which information concerning the quantity of heat (hereinafter referred to as "cooling heat quantity") capable of being cooled by the fan 1150 is registered. Fan electric power consumption 9030 is an entry with which information concerning the electric power required to operate the fan 1150 is registered. A turn-on flag 9040 is an entry with which information indicating that the fan 1150 is in operation is registered. Part information 9050 is an entry with which information concerning an identifier of device to be cooled by the fan 1150 is registered. If a plurality of parts are to be cooled, information concerning the identifiers as much as the number of the parts will be registered. Typical parts are the disk devices 1130.

The information concerning each of the entries other than the turn-on flag 9040 may be registered in advance at the time of factory shipment. For the turn-on flag 9040, the controller 1110 registers the information that, when the controller 1110 operates a fan 1150, the fan is in operation.

FIG. 23 shows an exemplary configuration of the disk system information 2005. Target electric power 23010 is an entry that registers information concerning an electric power to be targeted by the disk system 1100. Target calorific power 23020 is an entry that registers information concerning a calorific power to be targeted by the disk system 1100. The housing opening/closing information 23030 is an entry which exists for every housing constituting the disk system 1100 and in which information indicating whether or not a housing is in an opened state (for example, a state in which a cover is removed, or a state in which a door or a shutter is opened) or a closed state is registered.

In addition, it is conceivable the target electric power and the target calorific power are input by setting by a manager. In addition, as initial values, a total of electric power consumption of parts to be included in the disk system 1100 may be set in the target electric power consumption 22010, or a total of calorific power of parts to be included in the disk system 1100 may be set in the target calorific power 23020. The total of electric power consumption corresponds to a maximum electric power consumption when the whole system runs, and the total of calorific power corresponds to a maximum calorific power when the whole system runs. Further, as the target electric power consumption, a total of electric power capacity (this corresponds to a limiting electric power in the system) of the power supply module 1160 and the power supply module 1116 included in the disk system 1100 may be set.

Further, it is conceivable that an opening/closing sensor is installed in a cover, a door, or a shutter of the disk system 1100, which executes the failure monitoring program 2040, whereby the housing opening/closing state is set based on opening/closing information output by the sensor. It should be noted here that the housing opening/closing state may be set by detection of the opening/closing by the disk system 1100 through other methods.

Figure 10:
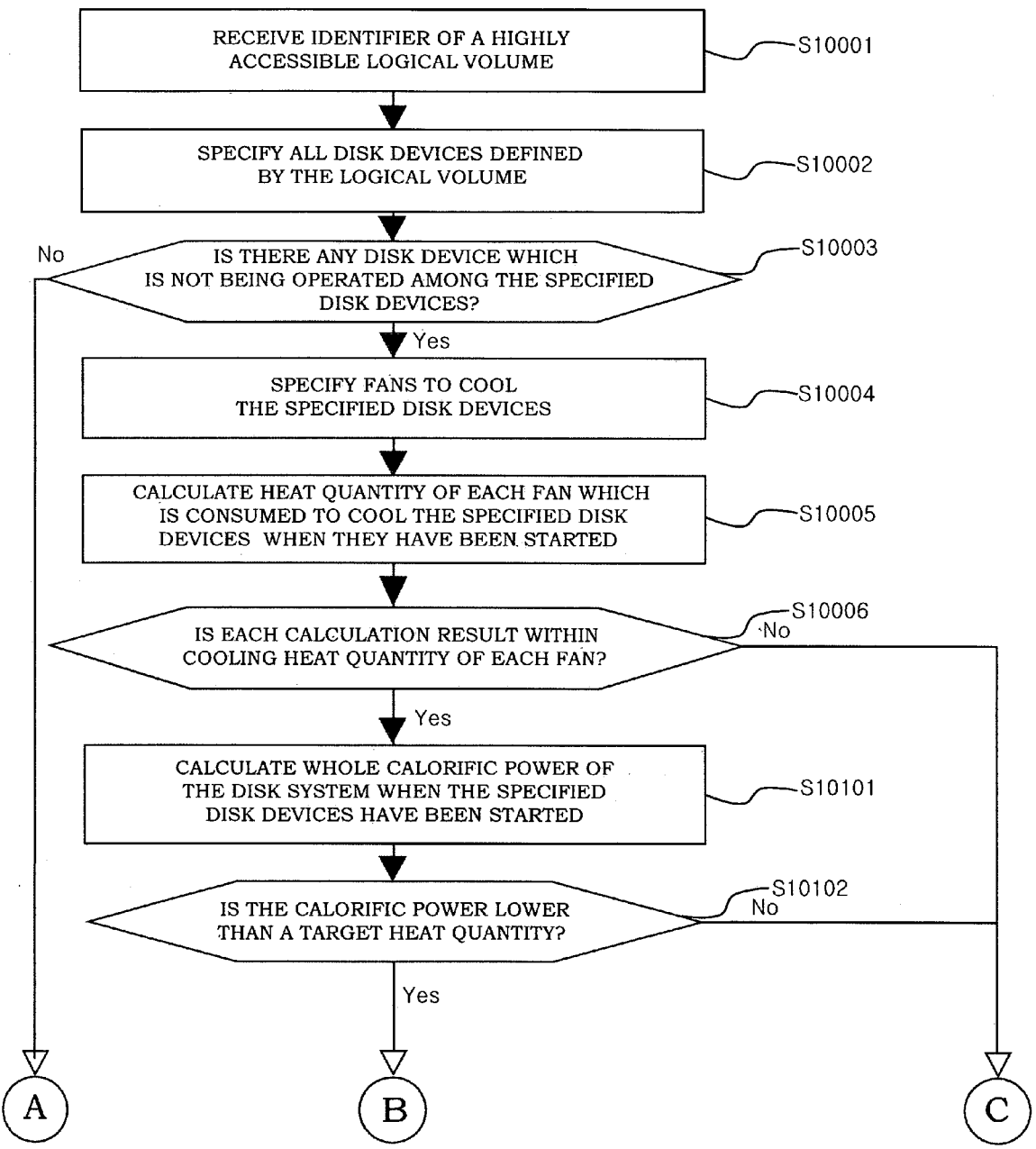
FIG. 10 shows an exemplary processing sequence of a disk system 1100.
Figure 24:
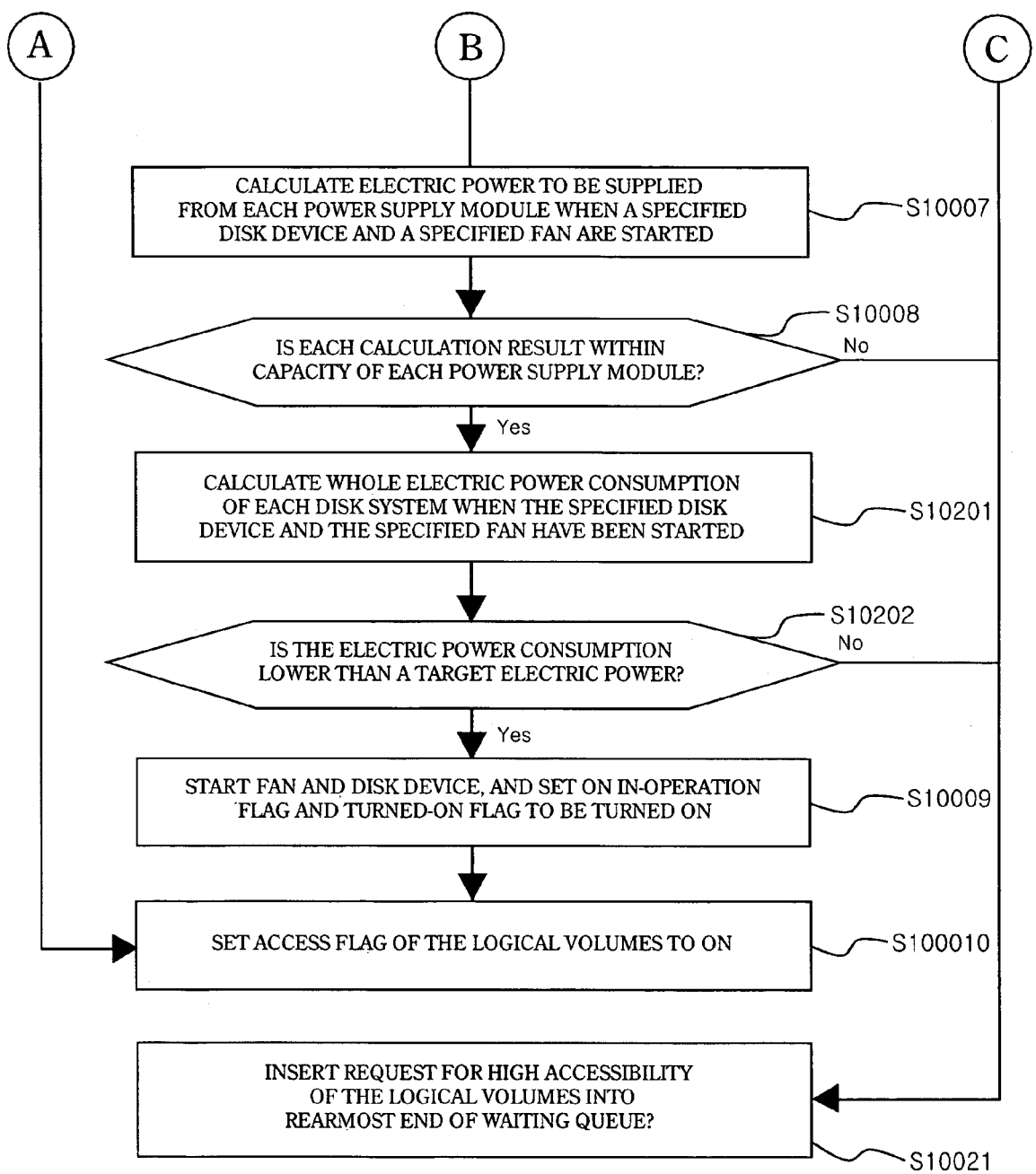
FIG. 24 shows another exemplary processing sequence of the disk system 1100.

FIGS. 10 and 24 show an exemplary processing sequence of the disk system 1100 when the disk system 1100 has received information (request) that the accessibility to a certain logical volume 1140 (here, the logical volume 1142 in FIG. 5) is raised, from the host computer 1200. In addition, this processing can be achieved as the CPU 1111 executes the improvement direction acceptance program 2010.

The controller 1110 receives information concerning a logical volume 1140 (here, the local volume 1142) to which the accessibility is raised (S10001). Next, the controller 1110 searches the logical volume management information 2001 with respect to the logical volume 1142, and specifies a disk device 1130 (here, disk devices 1133 and 1135) corresponding to the logical volume 1142 (S10002). Next, the controller 1110 checks the in-operation flag 7050 of the disk device management information 2002 to investigate whether or not there is any disk device 1130 (in this case, it is assumed that the disk device 1133 is not being operated) which is not started, among the disk devices 1130 (S10003).

If there is any disk device 1130 that is not started, the controller 1110 searches the fan information 2004 to specify a fan 1150 (here, the fan 1151) that cools the disk device 1130 that is not operated. At the time, the controller 1110 confirms whether or not the specified fan 1150 is being driven (S10004).

Next, the controller 1110 calculates a calorific power to be cooled by each fan 1150 specified in S10004 when the disk device 1130 specified in S10003 have been started, using the fan information 2004 and the disk device management information 2002 (S10005). Thereafter, the controller 1110 compares the calculated calorific power with the cooling heat quantity 9020 of the fan 1150 (S10006).

If the calorific power calculated for all the fans 1150 (including a fan 1150 which is not driven) specified in S10004 does not exceed the cooling heat quantity of the fans 1150, the controller 1110 calculates the calorific power of the whole system 1100 when the disk device 1130 specified in S10003 has been newly started (S10101). Thereafter, the controller 1110 compares the calculated total of calorific power with a target heat quantity registered in the disk device information 2005 (S10102).

If the calculated calorific power is lower than the target heat quantity, the controller 1110 calculates, for every power supply module 1160, an electric power to be supplied by each power supply module 1160 when its is assumed that the disk device 1130 specified in S10002 and a fan 1150 which is not operated among the fans 1150 specified in S10004 are additionally started, using the power supply module information 2003, the fan information 2004, and the disk device management information 2002 (S10007). Thereafter, the controller 1110 compares the electric power calculated for each power supply module 1160 with the electric power capacity of the power supply module 1160 registered in the power supply module information 2003 (S10008).

In all the power supply modules 1160, if the calculated electric power does not exceed the power supply module capacity registered in the power supply module information 2003, the controller 1110 calculates the electric power consumption of the overall disk system 1100 when its is assumed that the disk device 1130 specified in S10003 and a fan 1150 which is not operated among the fans 1150 specified in S10004 are additionally started (S10201) Next, the controller 1110 compares the calculated electric power consumption of the overall disk system 1100 with a target electric power registered in the disk device information 2005 (S10202).

If the calculated electric power consumption is lower than the target electric power, the controller 1110 starts the disk device 1130 specified in S10003 and a fan 1150 that is not driven among the fans 1150 specified in S10004, and sets the in-operation flag 7050 and the turn-on flag 9040 to ON (S10009). If no disk device 1130 to be started exists, or after the completion of the processing in S10009, the controller 1110 set the access flag 6070 of the logical volume 1140 received in S10001 to ON, reports the result to the host computer 1200, and then completes the processing (S1OO10).

In addition, the information at the time of the report may simply include information concerning direction acceptance completion or may include information concerning the started disk device 1130 and fan 1150.

If the heat quantity generated by the starting of the disk device 1130 exceeds the cooling capacity of the fan 1150, if the heat quantity is greater than the target calorific power, or if the electric power exceeds the power supply module capacity or become more than the target electric power, the controller 1110 inserts a request for raising the accessibility of the logical volume 1140 received in S10001 into the rearmost end of a waiting queue, reports the result to a request source, and then completes the processing. The information at the time of the report may include information concerning direction acceptance non-completion. Further, the information received in S10001 may include information that it is unnecessary to insert the request into the waiting queue, or if it can be seen that the insertion is unnecessary through other methods, the insertion of the request into the waiting queue may be omitted. The request stored in the waiting queue is again executed by the controller 1110 after a predetermined period of time has lapsed or by a specific trigger.

In addition, it may be determined in S10006 whether or not it is possible to cool the disk device 1130 (including any disk device 1130 to be additionally started) with only the fan 1150 which has already been driven, among the specified fan 1150 (including a fan which is not driven), by the configuration (for example, when a plurality of fans 1150 commonly take charge of cooling of one or a plurality of disk devices 1130) of the system. If it is possible to perform the cooling with only the fan 1150 that is being running, the controller 1110 may perform the processing that the driving of a fan 1150 that is not driven is not considered in the subsequent processing.

(Rock: OK)

Figure 11:
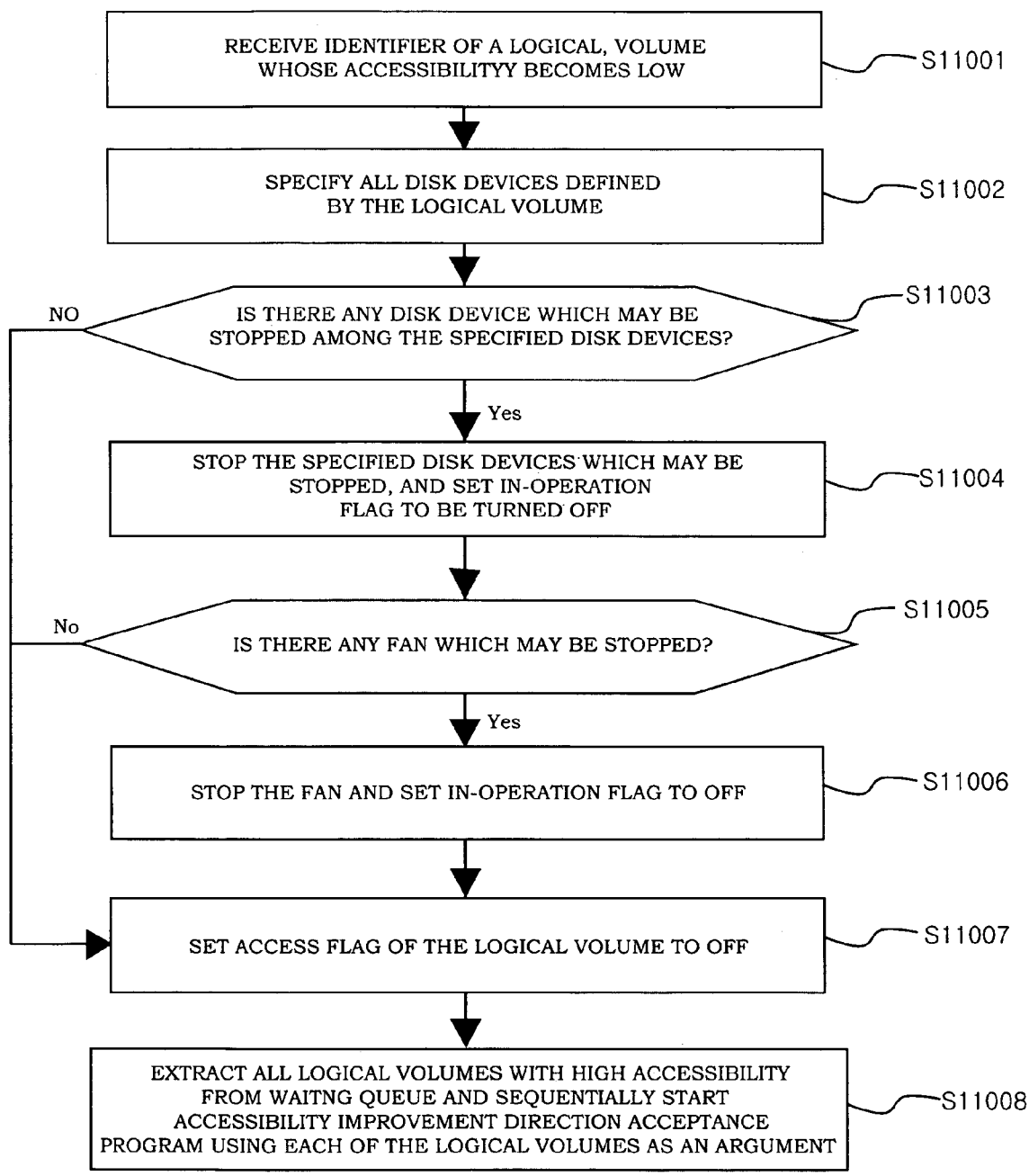
FIG. 11 shows another exemplary processing sequence of the disk system 1100.

FIG. 11 is a flow showing an example of processing of the disk system 1100 when the disk system 1100 has received the information that the accessibility to a certain logical volume 1140 is lowered, from the host computer 1200 (or the management computer 1300). This processing can be achieved as the CPU 1111 executes a direction acceptance program.

The controller 1110 receives information concerning a logical volume 1140 to which the accessibility is lowered (S11001). The controller 1110 searches the logical volume management information 2001 to specify all disk devices 1130 defined by the logical volume 1140 corresponding to the information (S11002). Then, the controller 1110 confirms whether or not there is any disk device 1130 which may be stopped among the specified disk devices 1130. Specifically, the controller 1110 checks the in-operation flags 7050 of the specified disk devices 1130 in the disk device management information 2002 to specify a disk device 1130 which are being driven. After the disk device 1130 which may be stopped is specified, the controller 1110 confirms whether or not the disk device 1130 is allocated to other logical volumes 1140. If the disk device is also allocated to other logical volumes 1140, the specified disk device 1130 cannot be stopped. Thus, the controller 1110 excludes such a disk device 1130 from the disk devices 1130 which may be stopped (S11003).

If the disk device 1130 which may be stopped is specified, the controller 1110 stops the specified disk device 1130 and set a corresponding in-operation flag 7050 to OFF (S11004). Further, the controller 1110 confirms whether or not there is any fan 1150 which may be stopped by the stopping of the specified disk device 1130. Specifically, the controller 1110 specifies the fan 1150 (S11005) that all the disk devices 1130 to be cooled will stop, as the specified disk device 1130 is stopped (S11005)

The controller 1110 stops the specified fan 1150, and then registers OFF information in the turn-on flag 9040 of a corresponding fan 1150 (S11006). If there is no disk device 1130 which may be stopped or after the processing in S11006, the controller 1110 registers OFF information in the access flag 6070 of the logical volume 1140 designated in the received information, and transmits the result to the host computer 1200 (S11007).

Thereafter, the controller 1110 sequentially extracts the information concerning logical volumes which are registered in the waiting queue and to which the accessibility has been raised, and executes the accessibility improvement direction acceptance program (S11008). Thereby, the remaining power of electric power and heat quantity generated by newly stopping the disk device 1130 and the fan 1150 can be used for starting of any one or both of the disk device 1130 and the fan 1150 for improvement of the accessibility of other logical volumes.

In addition, in the above-described processing, the fan 1150 has been considered in terms of the driving and stopping only. However, if the number of rotations of a fan can be controlled, when any disk device 1130 to be started is specified, the controller 1110 may perform a control to increase the number of rotations of a fan 1150 to cool the disk device 1130. Conversely, if any disk device 1130 to be stopped is specified, the controller 1110 may perform a control to reduce the number of rotations of a fan 1150 to cool the disk device 1130.

By doing so, for example, when one fan 1150 takes care of cooling of four disk devices 1130 and one disk device 1130 of the disk devices is stopped, the controller 1110 decreases the number of rotations of the disk device 1150 down to the number of rotations at which the fan can cool the other three disk devices 1130, whereby the electric power consumption can be reduced while the other three disk devices 1130 are cooled. Further, Noise can be reduced by decrease the number of rotation.

In addition, as a method of calculating the electric power consumption, there is a method of calculating a total of electric power consumption in respective parts of the fan 1150 and the disk device 1130 which are being started or is intended to start with reference to the disk device management information 2002 or the fan information 2004. Further, as a comparison method, a method of comparing a total value with the electric power capacity 8020 of a corresponding power supply module 1160 is conceivable. However, as modifications, combinations with the following methods are also conceivable.

(1) A calculating method in which the operating state of each part is considered The disk device 1130 is different in electric power consumption in a state immediately after it has been started and a state in which time has lapsed after the starting. Further, it is also conceivable that the fan 1150 is allowed to rotate at lower speed, thereby making the electric power consumption small instead of making the cooling heat quantity small. Further, it is also conceivable that, if a plurality of fans 1150 performs the cooling of a common disk device 1130, the number of fans 1150 to be started is increased or reduced. Therefore, as a calculating method of the electric power consumption, the electric power consumption of individual parts is first obtained in consideration of the operating state of each part, and required electric power consumption is then obtained from the obtained electric power consumption.

Further, it is also conceivable that, if the controller 1110 executes the failure monitoring program 2040 to detect a failure leading to a decrease in the feed rate of the electric power 1160, a value from which the electric power supply capacity of the power supply module 1160 is cut down is compared with a calculated value in anticipation of the decrease in the feed rate of the electric power caused by the failure. By doing so, it is possible to avoid performing the starting of the disk device 1130 and the fan 1150, for example, beyond the capacity of the electric power modules 1160 even in a state of the decrease in the feed rate of the electric power. Specifically, the controller 1110 executes the failure monitoring program 2040 periodically to monitor the state of the power supply module 1160. In this case, if some (for example, if the power supply module 1160 is composed of a plurality of power supply modules, and some of them stop due to failure) or all of the power supply modules 1160 stop due to failure, the controller 1110 may rewrite the value of the power supply module capacity 8020 of the power supply module information 2003 to a value decreased due to the failure.

(2) A case in that parts such as batteries or capacitors which enable temporary supply of electric power are included in the disk system It is also conceivable that electric power supply parts, such as batteries or capacitors, vary in electric power capacity. Thus, it is also conceivable that the disk system 1100 itself confirms the state of such parts to obtain changes in the electric power capacity and use the changes for comparison. Similar to the above-described failure of the power supply module 1160, this can be realized by checking the above changes by the controller 1110 to rewrite the values registered in the power supply module information 2003.

In addition, as a method of calculating the calorific power, there is a method of calculating a total of electric power consumption for respective parts of disk devices 1130 which are being started or are intended to start, referring to the disk device management information 2002. Further, as a comparison method, a method of comparing a total value of the calorific power with the cooling heat quantity 9020 of a corresponding fan 1150 is conceivable. However, as modifications, combinations with the following methods are also conceivable.

(1) A method of calculating the calorific power in consideration of the state of the disk device 1130

If the operating time of the disk device 1130 becomes long after it is introduced, the calorific power increases. Therefore, it is also conceivable that the calorific power is obtained while the state of each disk device is confirmed periodically, and then the total value is calculated from the obtained calorific power. Specifically, it is preferable that the controller 1110 confirms the calorific power of the disk device 1130 periodically, and then rewrites the disk device management information 2002.

(2) A calculation and comparison method in which the temperature of the disk device 1130 is considered In order to perform cooling in consideration of a dynamic temperature change of the disk device 1130, it is also conceivable to adopt a method of adding the cooling heat quantity additionally required for cooling the temperature of the disk device 1130 to an intended temperature, to the calorific power of the disk device 1130. Further, although a highest temperature of a disk device, which is being used, is specified as the specification of the disk device, it is also conceivable to use the disk device at a temperature lower than the highest temperature, if the system is intended to use with longer life span. However, if the disk device is intended to operate at a low temperature within a range of the specified cooling heat quantity, a number of disk devices 1130 cannot be run. Thus, it is desirable to adopt a configuration in which a desired operation mode (access priority, life span priority, etc.) may be set by a manager and the calculation and comparison is performed in response to the setting.

(3) A method of considering changes in flow of air or cooling fluid of the disk system 1100

Generally, the cooling of a device is performed by moving heat generated by the device to a fluid (for example, air or cooling water, which is referred to as "cooling fluid") which exists around the device, and moving the fluid to the outside of the device. Further, fins may be interposed for movement of the heat between the device and the cooling water. Therefore, when the device is cooled, in addition to the specific heat, heat conductivity, and temperature of the cooling fluid, the flow rate of the cooling fluid moving around the device is related to the cooling efficiency.

However, there is a case that, when maintenance of the disk system 1100 is performed, a cover of an entire or partial housing of the disk system 1100 is opened. In this case, since the flow of the cooling water within the disk system 1100 varies, the cooling heat quantity of a fan changes (for example, lowers) compared with a case in which the housing is closed. It is conceivable to adopt a method that performs the comparison of the cooling heat quantity in consideration of a state change (particularly, opening and closing of the cover of the housing) that leads to such a change in the flow of the cooling water. For example, when the controller 1110 performs the above-described processing in FIG. 10, etc., the controller 1110 refers to opening/closing information 22030. If the housing is found to be open, the controller 1110 calculates the cooling heat quantity 9020 of the fan 1150 in consideration of an amount of decrease in the cooling capacity to perform the processing in FIG. 11, etc., with the values.

In addition, in a case of using the present comparison method, it is also possible to provide the outside of the disk system 1100 with the information which correlates the starting of the disk device with the opening/closing of the housing, such that the result that the disk device 1130 could not be started due to the opening/closing of the housing, is reflected on the result of response to the host computer 1200 from the disk system 1100. Further., it is also conceivable that, if the cover of the housing is opened from its closed state, the disk system 1100 itself detects the phenomenon to stop the disk device 1130 that are being driven.

Of course, the respective calorific power, electric power consumption, electric power capacity, and cooling heat quantity may be considered by, for example, calculating the electric power consumption and the calorific power or performing the comparison, using other methods than the above modifications.

Further, there is a case that the disk system 1100 accesses to the disk device 1130 which are not driven, at a time other than the time when an access request including read/write from the host computer 1200 has arrived. For example, it is conceivable that the following processing by the disk system 1100 is executed.

(1) Parity group recovery processing, such as copy of data to spare disks when disk devices 1130 in a parity group stop due to failure (2) Encryption, compression and garbage collection of data included in the logical volume (3) Data copy and data relocation between two logical volumes inside the disk system 1100

(4) Data copy and data relocation between different disk systems 1100

Even when such processing by the disk system 1100 accessing to the data in a disk device 1130 which is not driven, the controller 1110 can execute the accessibility improvement direction acceptance program 2010, thereby performing the starting of the disk device 1130 and the fan 1150 in consideration of the electric power consumption and the calorific power. However, in this case, if electric power consumption or a calorific power is caused beyond the target electric power 23010 and the target heat quantity 22020 due to the starting of the disk device 1130, a desired disk device 1130 is not started and the controller 1110 cannot access to the data. As a result, the above-described processing by the disk system 1100 sometimes does not proceed or stop. In order to notify the manager of this situation, it is also conceivable to provide screen output that provides the fact that the reason of failure of the processing by the disk system 1100 is related to the electric power consumption and the calorific power.

(Rock: OK)

Further, it is also conceivable to perform exceptional processing about high-priority processing on the ground that the risk of data loss is high as in the parity group recovery processing. For example, the disk system 1100 or a manager sets the priority of processing contents. If the disk device 1130 and the fan 1150 are started with respect to the high-priority processing, the disk device 1130 and the fan 1150 are started even if a total of electric power consumption is more than a target electric power or a total of calorific power is more than a target heat quantity. In this case, in the processing sequence described referring to FIG. 10, etc., the controller 1110 may omit the processing in Steps S10102 or S10202 according to the priority.

Moreover, in the first embodiment, the disk devices to be driven are determined in units of logical volumes. However, it is possible to determine disk devices to be driven according to which disk device is to store the data for which read or write is requested, not the units of logical volumes.

Further, in the first embodiment, the disk device and the fan are started if only the request for all the electric power consumption, heat quantity, target electric power and target heat quantity is satisfied. However, it is also conceivable to adopt a configuration in which the disk device and the fan are started in consideration of the heat quantity and the maximum electric power only. In this case, it is desirable to set the target electric power as the maximum electric power. Further, it is possible to adopt a configuration in which a request to be considered can be discarded or selected by a manager. Thereby, it is possible to realize driving of the disk device according to a manager's request.

Figure 12:
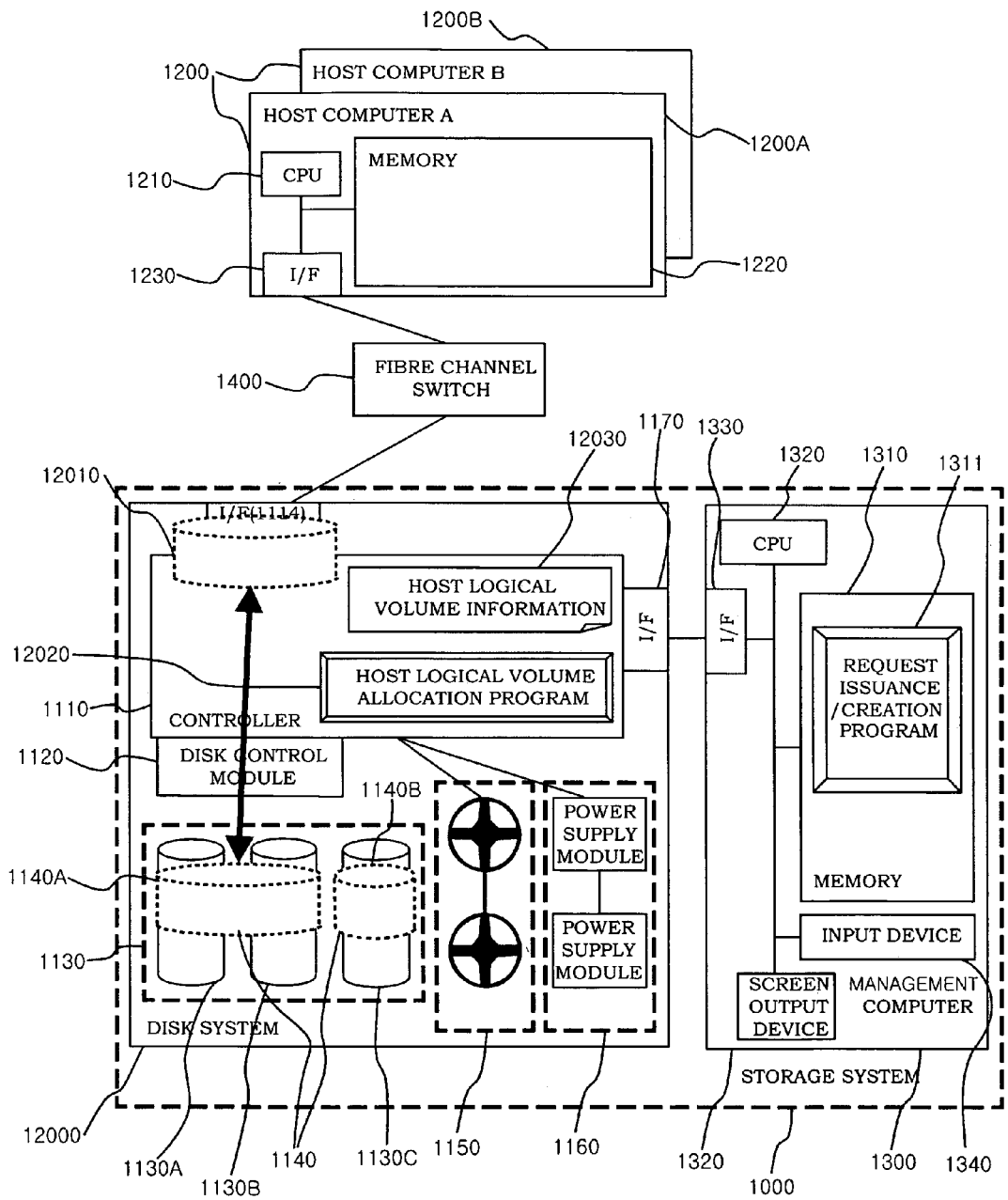
FIG. 12 shows an exemplary configuration of a system in a second embodiment.

FIG. 12 shows an exemplary configuration of a system to which a second embodiment is applied. The second embodiment is different from the first embodiment in that an virtually storage region to be accessed by the host computer 1200 is called a host logical volume 12010. In addition, the information, the programs and the hardware inside the controller 1110, which are shown in FIG. 1, are omitted in FIG. 12. The host logical volume 12010 is an virtually logical volume that is created as the CPU 1111 executes the access processing program 2030. The host logical volume 12010 is correlated with the logical volume 1140.

The controller 1110 converts the logical volume 1140 to the host logical volume 12010 on the basis of the access host logical volume information 12030, which will be described below, to provide it to the host computer 1200, and vice versa. In addition, the number of the host logical volume 12010 may be specified in the upper limit number for various reasons.

Here, the second embodiment is characterized in that the host computer 1200 allocates the host logical volume 12010 to only a logical volume 1140 to which the accessibility has been raised so as to enable access from the host computer 1200 and start any disk device 1130 which is not started. Further, the second embodiment is characterized in that the host computer releases a logical volume 1140 to which the accessibility has been lowered from the allocation of the host logical volume 12010 so as to disable the access from the host computer 1200 and stop the disk device 1130, if possible.

Specifically, the system of the second embodiment operates in the following manner. First, the host computer 1200 notify the disk system 12000 of an identifier or an address of a logical volume 1140 to which the accessibility has been raised. The controller 1110 executes a host logical volume allocation program 12020 to notify the host computer 1200 of an identifier of the host logical volume 12010 to be allocated to the notified logical volume 1140. The host computer 1200 gets access to a host volume virtually in the disk system 12000, using the notified identifier.

Meanwhile, for a logical volume 1140 to which the accessibility has been lowered, the host computer 1200 notifies the disk system 12000 of an identifier the logical volume 1140 or an identifier of a corresponding host logical volume 12010. The disk system 12000 deletes the information concerning the corresponding relation between the notified host logical volume 12010 and the corresponding logical volume 1140 from the control program 1113.

In the second embodiment, the host logical volume information 12030 is provided in the management information in the control program 1113. Here, the information concerning the corresponding relation between the host logical volume 12010 and the logical volume 1140 is registered.

FIG. 13 shows an exemplary configuration of the host logical volume information 12030. The host logical volume information 12030 has entries with which the following information is registered for every host logical volume 12010. A host logical volume identifier 13010 is an entry with which information concerning an identifier of a corresponding host logical volume 12010 is registered. A logical volume address 13020 is an entry with which information concerning an identifier of a logical volume 1140 allocated to the host logical volume 12010 is registered. Here, if a logical volume 1140 is not allocated to the host logical volume 12010, it is assumed that this value is a null value.

Except for the above points, the configuration of the second embodiment is the same as that of the first embodiment.

FIG. 14 shows an exemplary processing sequence when the disk system 12000 has received information concerning a logical volume 1140 to which the accessibility has been raised. In addition, the following processing is performed as the CPU 1111 of the controller 1110 executes the host logical volume allocation program 12020.

The controller 1110 of the disk system 12000, which has received information (an identifier) about a logical volume 1140 to which the accessibility has been raised (S14010), and executes the accessibility improvement direction acceptance program 2010, using the received identifier (S14020).

Next, the controller 1110 confirms whether or not the disk device 1130 has been started, as a result of the execution of the accessibility improvement direction acceptance program 2010 (S14030). If the disk device 1130 has been started, the controller 1110 searches a host logical volume 12010, to which any logical volume 1140 is not allocated, from the host logical volume information 12030. In addition, if the controller 1110 has received an identifier of a desired host logical volume 12010 additionally, the controller may search a host logical volume 12010 corresponding to the received identifier (S14040).

Next, the controller 1110 confirms whether or not a host logical volume 12010 to meet the conditions could be found (S14050). If a host logical volume 12010 to meet the conditions is found, the controller 1110 registers the information concerning the identifier of the logical volume 1140 received in the S14010, to an entry corresponding to the host logical volume 12010 found in the host logical volume information 12030. Thereafter, the controller 1110 transmits completion of allocation including the information concerning the identifier of the allocated host logical volume 12010 to the host computer 1200 and then completes the processing (S14060).

On the other hand, if it is determined in Step S14030 that the disk device 1130 cannot be started, the controller 1110 notifies the host computer 1200 of failure of the allocation and then completes the processing. In addition, the reasons why the disk device 1130 cannot be started, such as the reasons that the conditions of the calorific power or the electric power consumption were not satisfied, may be included in the notification at this time (S14100).

If a host logical volume 12010 to be allocated was not found, the controller 1110 executes the accessibility degradation direction acceptance program 2020, stops the disk device 1130 and the fan 1150, if possible, then notifies the host computer 1200 of failure of the allocation, and completes the processing. In addition, the reason why the allocation of a host logical volume has failed may be included in the notification at this time.

Figure 15:
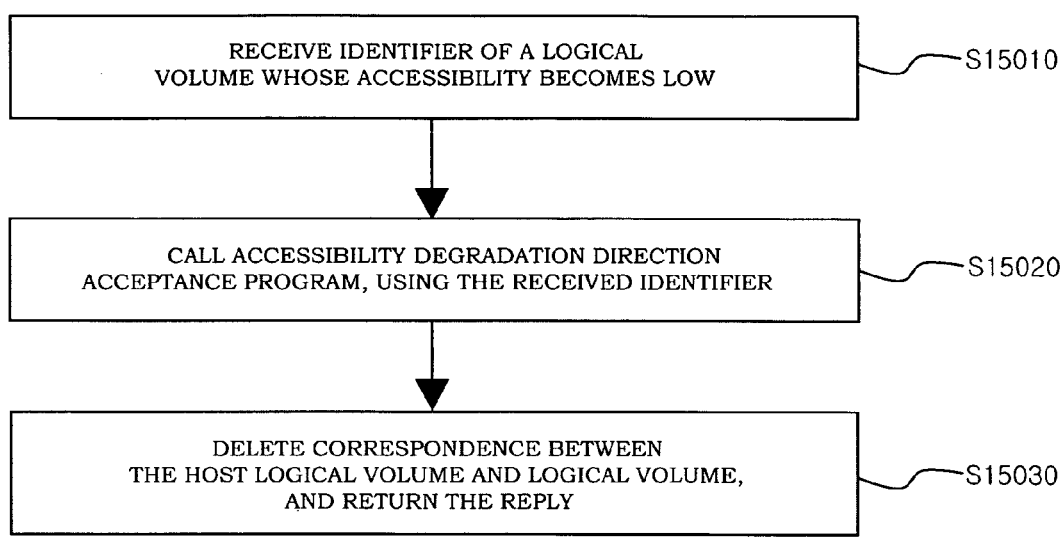
FIG. 15 shows another exemplary processing sequence when the disk system 12000 has received a host logical volume open request.

FIG. 15 shows an exemplary processing sequence to be executed by the disk system 12000 when the disk system 12000 has received information of lowering of the accessibility to a logical volume 1140. This processing can be achieved as the CPU 1111 executes the host logical volume allocation program 12020.

The disk system 12000 receives information of an identifier of a logical volume 1140 or a host logical volume 12010 to which the accessibility has been lowered from the host computer 1200 (15010). Thereafter, the controller 1110 of the disk system 12000 executes the accessibility improvement degradation acceptance program 2020, using the received identifier, and if there are any disk device 1130 and a fan 1150 which can be stopped, stops them (S15020). Thereafter, the controller 1110 deletes the correspondence in the host logical volume information 12030 between the host logical volume 12010 and the logical volume 1140 (nullifies the value of the logical volume identifier 13020), notifies the host computer 1200 of completion of the processing, and completes the processing (S15030).

In addition, one logical volume 1140 may correspond to a plurality of host logical volumes 12010, and some data regions of a host logical volume 12010 may correspond to all or some regions of a logical volume. In this case, it should be noted that information concerning a starting address and an ending address of the host logical volume 12010 and information concerning a starting address and an ending address of the logical volume 1140 are added to the host logical volume information 12030. In addition, the allocation and release of the host logical volume 12010 includes the concept of allocation and release of logical unit numbers of SCSI and iSCSI, controller unit numbers of a main frame, LDEV numbers, etc.

Figure 16:
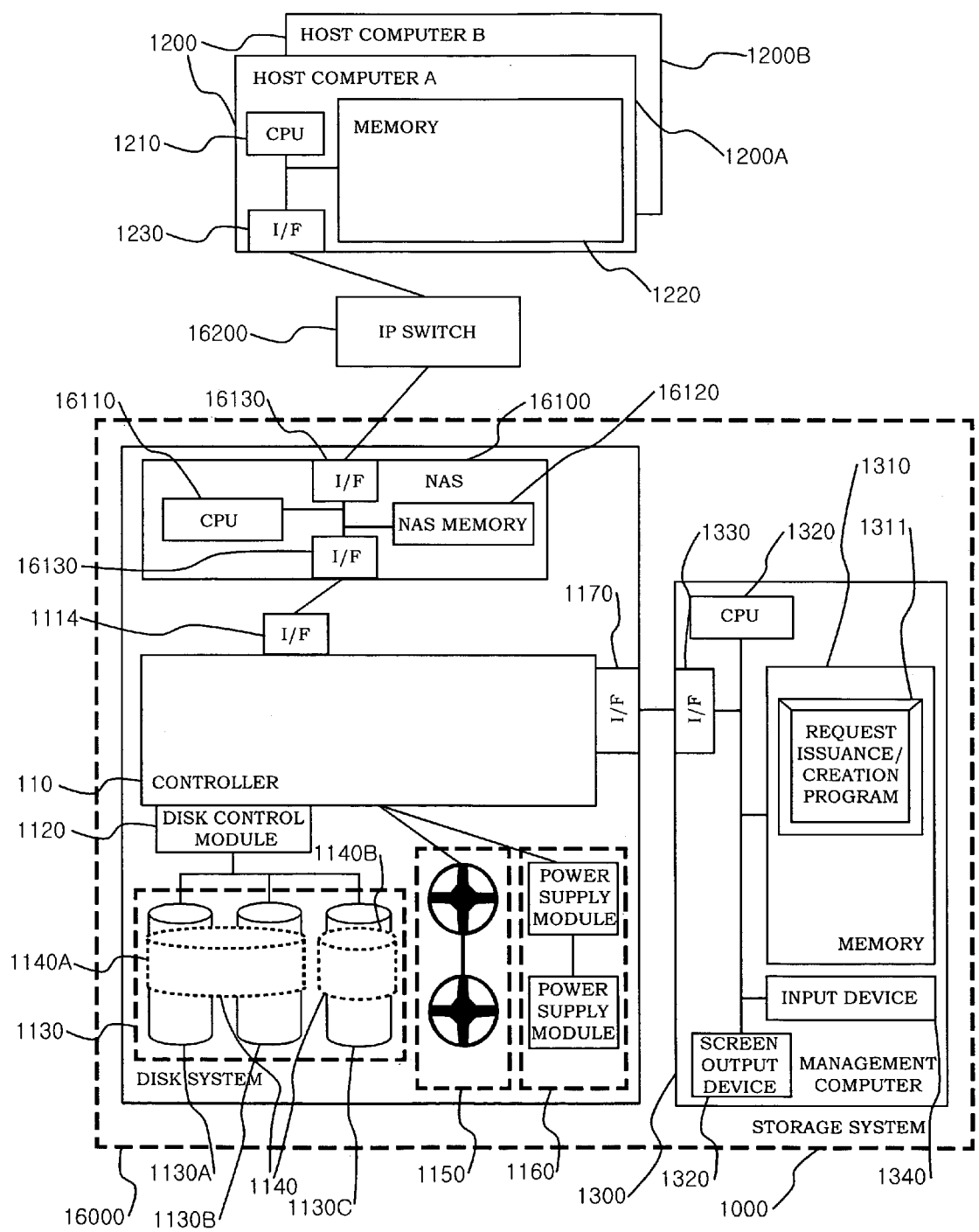
FIG. 16 shows an exemplary configuration of a system in a third embodiment.

FIG. 16 shows an exemplary configuration of a system to which a third embodiment is applied. In addition, the information, the programs and the hardware inside the controller 1110, which are shown in FIG. 1, are omitted in FIG. 16. The difference between the third embodiment and the first embodiment lies in that, in the third embodiment, a controller 16100 (hereinafter referred to as "NAS 16100") implementing the NAS (Network Attached Storage) is added to the inside of the disk system 16000. In addition, although the NAS 16100 exists inside the disk system 16000 referring FIG. 16, as another embodiment, the NAS 16100 may exist outside the disk system 16000.

Since a protocol used for communication between the NAS 16100 and the host computer 1200 is a normal IP, the host computer 1200 and the NAS 16100 are connected to each other by an IP switch 16200, which is different from the configuration in FIG. 1. Of course, the host computer 1200 and the NAS 16100 may be directly connected to each other. Further, although the NAS 16100 accesses to the logical volume 1140, it may access to the host logical volume 12010 described in the second embodiment.

The NAS 16100 has a CPU 16110, an NAS memory 16120, an interface 16130 for IP, and an interface 16140 for volume access. These elements are connected to each other via internal buses or over a network. The host computer 1200 transmits an access request in units of files (also referred to as file I/O or file level) to the NAS 16100. The NAS 16100 converts the access request in units of files to a request of access to a logical volume (also referred to as file I/O or file level) to transmit it to the controller 1110.

In the third embodiment, the NAS 16100 directs the controller 1110 to use or stop the logical volume 1140. Along therewith, the NAS 16100 transmits the information concerning the accessibility of the logical volume 1140 that the host computer 1200 transmits in the first and second embodiments. Generally, files are opened immediately before use, and are closed after completion of the use. Thus, if at least one of the files included in a logical volume 1140 is opened, the NAS 16100 determines that the accessibility of the logical volume 1140 has been raised, to notify the controller 1110 of the fact, while if there no file which is opened, the NAS 16100 determines that the accessibility of the logical volume 1140 has been lowered, to notify the controller 1110 of the fact.

In addition to the trigger that the NAS 16100 has received the above-described open request, when the NAS 16100 has received a mount request of a file system or a directory included in the logical volume 1140 from the host computer 1200, the NAS may determine that the accessibility of a corresponding logical volume 1140 has been raised, to notify the controller 1110 of this information. Similarly, in addition to the trigger that the NAS 16100 has received a close request, when the NAS 16100 has received an unmount request of a file system or a directory from the host computer 1200, the NAS may determine that the accessibility of a corresponding logical volume 1140 has been lowered, to notify the controller 1110 of this information.

In addition, the number determination reference of the file open may be any other numbers than zero, and it may be determined that the accessibility has been raised based on a file open request. Further, it may be determined that the accessibility has been lowered based on a file close. Similarly, the determination reference of the number of clients in process of mount may be any other numbers than zero. In addition, using any other methods than this, it may be determined that the accessibility has been raised based on a mount request, and it may be determined that the accessibility has been lowered based on an unmount request. Moreover, using other evaluation methods, it may be determined that the accessibility has been raised with file open/mount.

Figures 17, 18:
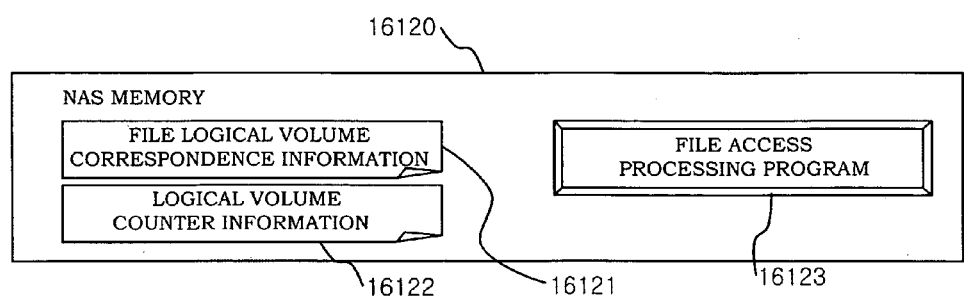
FIG. 17 shows an example of information and programs in an NAS memory.
FIG. 18 shows an exemplary configuration of logical volume counter information.

FIG. 17 shows an example of information and programs stored in the NAS memory 16120.

File logical volume correspondence information 16121 is information concerning the corresponding relation for acquiring an identifier of a logical volume 1140 including data of a file and an address which can designate data regions within the logical volume, from file names or other identifiers designated by the host computer 1200. Further, the file logical volume correspondence information 16121 may include information concerning access authority and access time, such as latest update time, creation time, latest reference time, etc. of files.

Logical volume counter information 16122 is information, for every logical volume 1140, for managing the number of clients that are being currently mounted or the number of files that are being currently opened.

A file access processing program 16123 is a program executed by the CPU 16110 when it receives and processes access requests, such as mount and unmount of a file system or a directory, as well as a file open request, a file close request, and a file read/write request from the host computer 1200.

When the file access processing program- executed at the CPU 16110 has received a file read request, the file access processing program 16123 refers the file logical volume correspondence information 16121 to recognize a logical volume 1140 and a data region to include required data, and transfer the data and completion message to the host computer 1200. When the program has received a file write request, the file access processing program 16123 refers the file logical volume correspondence information 16121 to recognize a logical volume 1140 and a data region to write data, then write the data received from the host computer 1200, and then transmits completion message to the host computer 1200.

FIG. 18 shows an exemplary configuration of the logical volume counter information 16122. The logical volume counter information 16122 has entries in which the following information is registered for every logical volume 1140.

A logical volume identifier 18010 is an entry with which information of an identifier of the logical volume 1140 is registered. An open counter 18020 is an entry with which information concerning the number of files included in a logical volume 1140 that is being currently opened is registered. A mount counter 18030 is an entry with which information concerning the number of host computers 1200 that is being mounting a file system included in a logical volume 1140 is registered.

Figure 19:
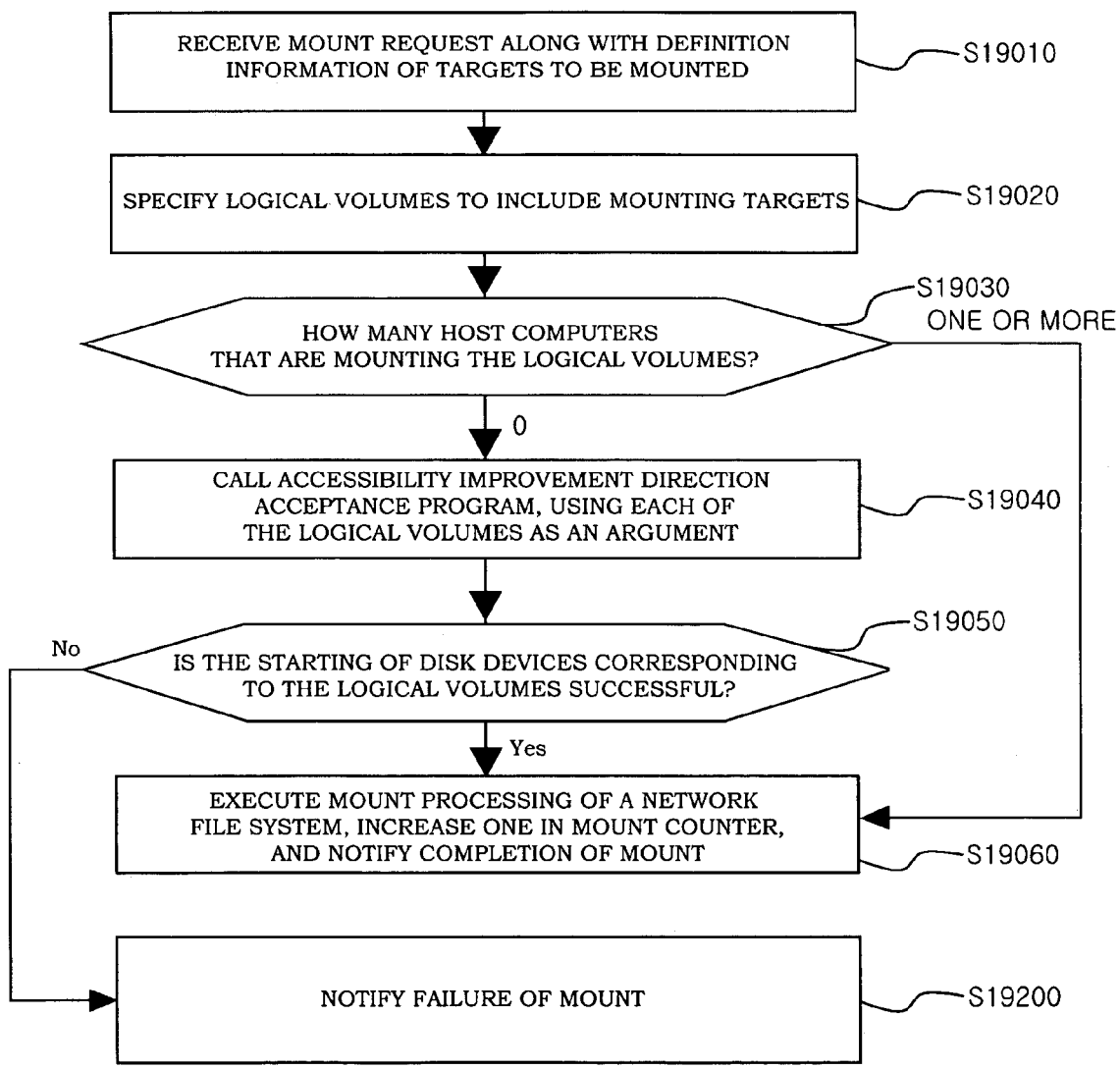
FIG. 19 shows an exemplary processing sequence when an NAS 16100 has accepted a mount request.

FIG. 19 shows an exemplary processing sequence when the NAS 16100 has received a mount request from the host computer 1200. The following processing sequence can be achieved as the CPU 16110 executes the file access processing program 18123. In addition, it is assumed in the following description that the NAS 16100 directs the controller 1110 to execute the processing described in the first embodiment, such as the starting of the disk device 1130, with a mount request or an unmount request as a trigger. However, as described above, the form of the trigger is various.

The NAS 16100 receives a mount request, along with information (an identifier or a directory name of a logical volume 1140 where a file system exists or information that identifies other files, directories and logical volumes) that defines a target to be mounted (S19010). The NAS 16100 specifies a logical volume 1140 to include a file system or a directory as a target to be actually mounted, from the information that defines the received mount target. In addition, the file logical volume correspondence information 16121 may be used for the specifying (S19020).

Next, the NAS 16100 confirms the number of host computers 1200 which are being mounting the specified logical volume 1140 by referring to the logical volume counter information 16122 (S19030).

If any host computer 1200 that counts the specified logical volume 1140 does not exist, the NAS 16100 directs the controller 1110 to execute the accessibility improvement direction acceptance program 2010 by using the specified logical volume 1140 as an argument, and then waits the response. The controller 1110, which has received the direction, starts any one or both of the disk device 1130 and the fan 1150 corresponding to the logical volume 1140, if possible, in consideration of electric power consumption and calorific power similar to the first embodiment, and transmits the result as a response to the NAS 16100 (S19040).

The NAS 16100, which has received the response from the controller 1110, confirms whether or not the content of the response is the content that the starting of the disk device 1130 has succeeded (S19050).

If the starting of the disk device 1130 has succeeded, the NAS 16100 performs mount processing of a network file system on the specified logical volume. Thereafter, the NAS 16100 adds one to a number registered in the mount counter 18130 of the logical volume counter information 16122, notify the host computer 1200 of completion of the mount, and then completes the processing (S19060).

Meanwhile, if the starting of the disk device 1130 has failed, the NAS 16100 notifies the host computer 1200 of failure of the mount, and then completes the processing. At this time, the NAS 16100 may include a message that the disk device could not be started due to the electric power consumption and cooling heat quantity, as a reason for the failure of the mount, in the notification to the host computer 1200 (S19200).

Figure 20:
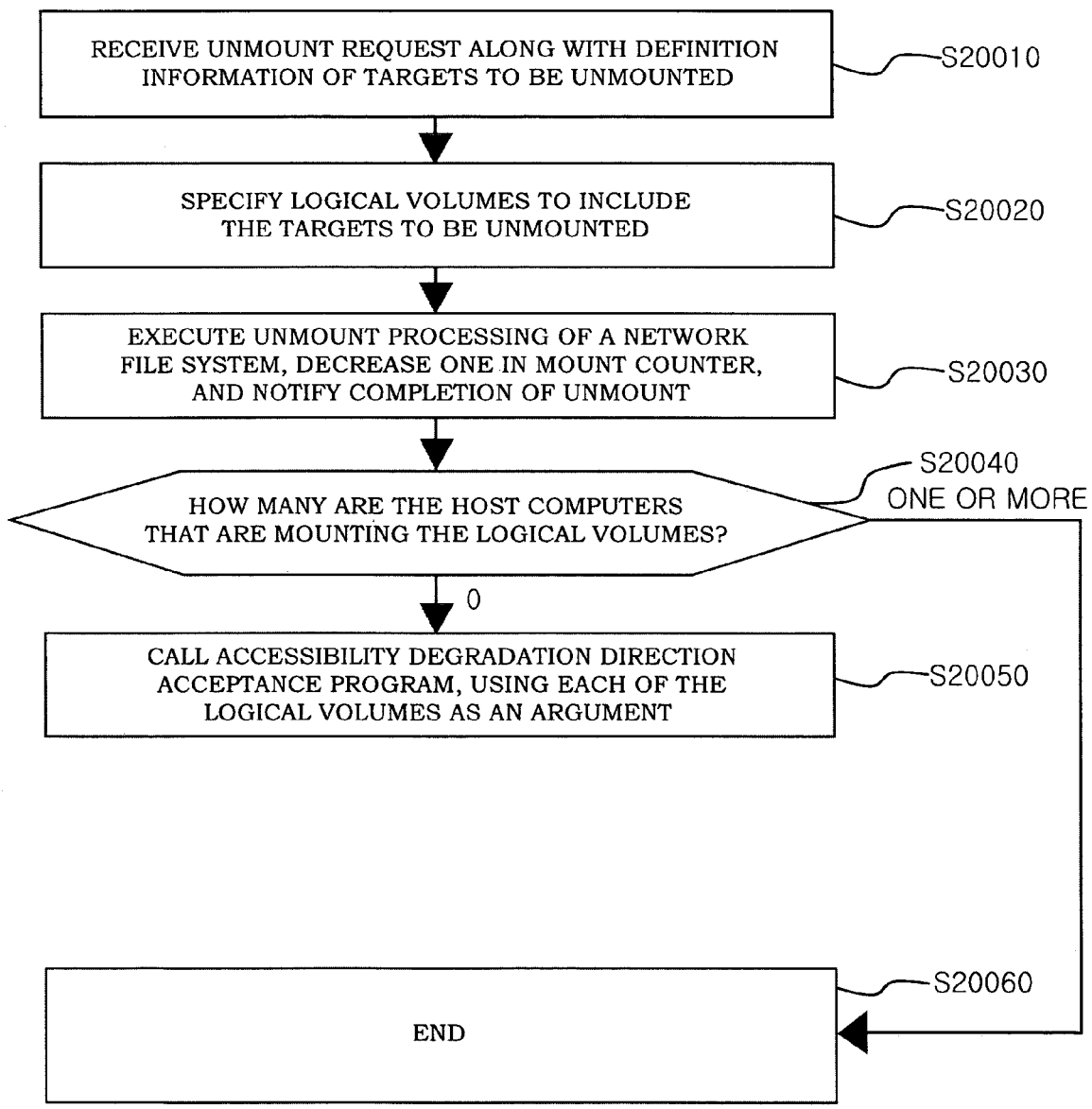
FIG. 20 shows another exemplary processing sequence when the NAS 16100 has accepted an unmount request.

FIG. 20 shows an exemplary processing sequence when the NAS 16100 has received an unmount request from the host computer 1200. This processing can also be achieved as the CPU 16110 executes the file access processing program 18123.

The NAS 16100 receives an unmount request, along with information (an identifier or a directory name of a logical volume 1140 where a file system exists or information that identifies other files, directories and logical volumes) that defines a target to be unmounted, from the host computer 1200 (S20010). The NAS 16100 specifies a logical volume 1140 to include a file system or a directory as a target to be actually unmounted, from the information that defines the received unmount target. In addition, the file logical volume correspondence information 16121 may be used for the specifying (S20020).

Next, the NAS 16100 performs unmount processing of a network file system, then subtracts one from a number registered in the mount counter 18030 of the logical volume counter information 16122 about the specified logical volume 1140, and notify the host computer 1200 of completion of the unmount (S20030). Next, the NAS 16100 confirms the number of host computers 1200 which are being mounting the specified logical volume 1140 by referring to the logical volume counter information 16122 (S20040).

If the number of any host computer 1200 that counts the specified logical volume 1140 is zero, the NAS 16100 directs the controller 1110 to execute the accessibility degradation direction acceptance program 2020 by using the specified logical volume as an argument. The controller 1110, which has received the direction, stops any one or both of the disk device 1130 and the fan 1150, if possible, and completes the processing (S20050). Meanwhile, if the number of the host computers 1200 that are being mounting the specified logical volume 1140 is one or more, the NAS 16100 completes the processing directly (S20060).

Next, an example in which the NAS 16100 directs the controller 1110 to execute the processing described in the first embodiment, such as starting of the disk device 1130, with a file open request or a file close request as a trigger.

Figure 21:
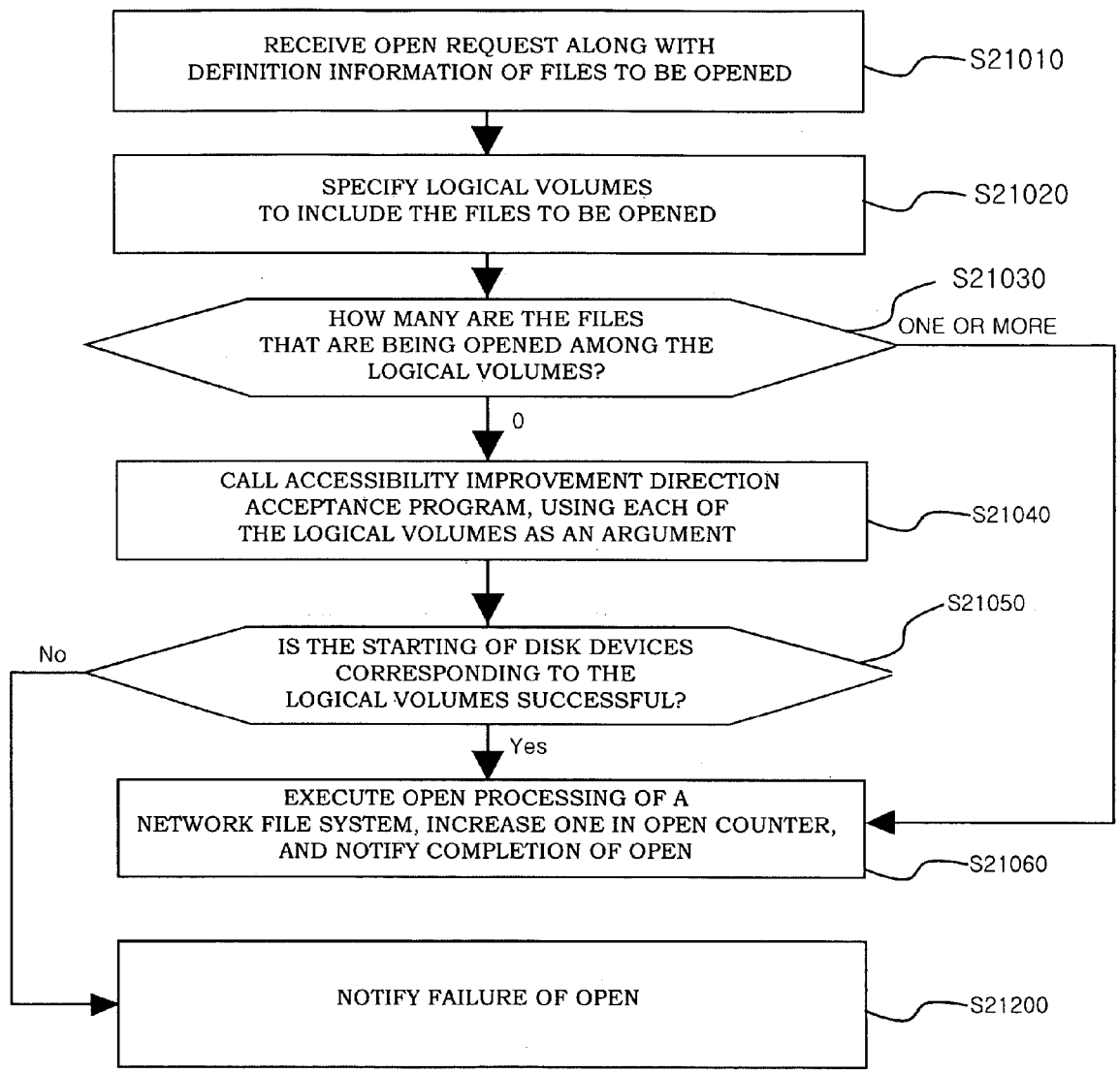
FIG. 21 shows an exemplary processing sequence when the NAS 16100 has accepted a file open request.

FIG. 21 shows an exemplary processing sequence when the NAS 16100 has received a file open request from the host computer 1200.

The NAS 16100 receives a file open request including information (file names and other identifiers) that defines a file to be opened (S21010). The NAS 16100 specifies a logical volume 1140 to include a file as a target to be actually opened, from the received information. In addition, the file logical volume correspondence information 16121 may be used for the specifying (S21020).

Next, the NAS 16100 confirms the number of files that are included in the specified logical volume 1140 and are being opened, by referring to the logical volume counter information 16122 (S21030).

If the number of files that are included in the specified logical volume 1140 and are being opened is zero, the NAS 16100 directs the controller 1110 to execute the accessibility improvement direction acceptance program 2010 by using an identifier of the specified logical volume 1140 as an argument, and then waits the response from the controller 1110. The controller 1110 starts any one or both of the disk device 1130 and the fan 1150 in consideration of electric power consumption and calorific power. Then, the controller 1110 transmits the result as a response to the NAS 16100 (S21040).

Next, the NAS 16100 determines whether or not the content of the response received from the controller 1110 is the content that the starting of the disk device 1130 has succeeded (S21050).

Next, if the response from the controller 1110 include the content that the starting of the disk device 1130 has succeeded, the NAS 16100 executes file open processing of a network file system, then adds one to a number registered in the open counter 18020 of the logical volume counter information 16122, corresponding to the specified logical volume 1140, notify the host computer 1200 of completion of the open, and completes the processing (S21050).

Meanwhile, if the response from the controller 1110 includes the content that the starting of the disk device 1130 has failed, the NAS 16100 notifies the host computer 1200 of failure of the open, and then completes the processing. At this time, the NAS 16100 may include a message that the disk device 1130 could not be started due to the electric power consumption and cooling heat quantity, in the notification of the open failure.

FIG. 22 shows an exemplary processing sequence when the NAS 16100 has received a file close request from the host computer 1200. This processing can also be achieved as the CPU 16110 executes the file access processing program 18123.

The NAS 16100 receives a file close request including information (file names, file handles, and other identifiers) that defines a file to be closed (S22010). Next, the NAS 16100 specifies a logical volume 1140 to include a file system or a directory as a target to be actually closed, from the information that defines the received file close target. In addition, the file logical volume correspondence information 16121 may be used for the specifying (S22020).

Next, the NAS 16100 performs file close processing of a network file system, and then subtracts one from a number registered in the open counter 18020 of the logical volume counter information 16122, corresponding on the specified logical volume 1140. Then, the NAS 16100 notifies the host computer 1200 of the completion of the file close (S22030).

Next, the NAS 16100 confirms the number of files which are included in the specified logical volume 1140 and are being opened, by referring to the logical volume counter information 16122 (S22040).

If the number of files that are included in the specified logical volume 1140 and are being opened is zero, the NAS 16100 directs the controller 1110 to execute the accessibility degradation direction acceptance program 2020 by using an identifier of the specified logical volume 1140 as an argument. The controller 1110 stops any one or both of the disk device 1130 and the fan 1150, if possible, and completes the processing (S22060). Meanwhile, if the number of files that are included in the specified logical volume 1140 and are being opened is one or more, the NAS 16100 completes the processing directly (S22060).

In addition, the processing sequence of file open and mount has been described, assuming that, if the controller 1110 could not start the disk device 1130, the controller 1110 does not register a direction from the NAS 16100 with a waiting queue. However, as other methods, it is conceivable to adopt a method in which, if the controller 1110 could not start the disk device 1130, the controller 1110 register a direction from the NAS 16100 with a waiting queue. In this case, it is conceivable to adopt a method in which the NAS 16100 transmits notification of open completion and mount completion to the host computer 1200, after the controller 1110 starts the disk device 1130 based on the waiting queue so that access to the logical volume 1140 becomes possible, instead of the notification of open failure in the above-described processing S19200 and S21200.

It is also conceivable to adopt a method in which, if the starting time of the disk device 1130 is long (including a case in which, if registered with the waiting queue, the own starting time of the device is long), the NAS 16100 transmits a message such that the host computer 1200 issues a request once again, to the host computer 1200. By doing so, the non-response time from reception of a request to reply thereto can be reduced, and erroneous recognition of a failure of the disk system 16000 can be avoided.

Figure 25:
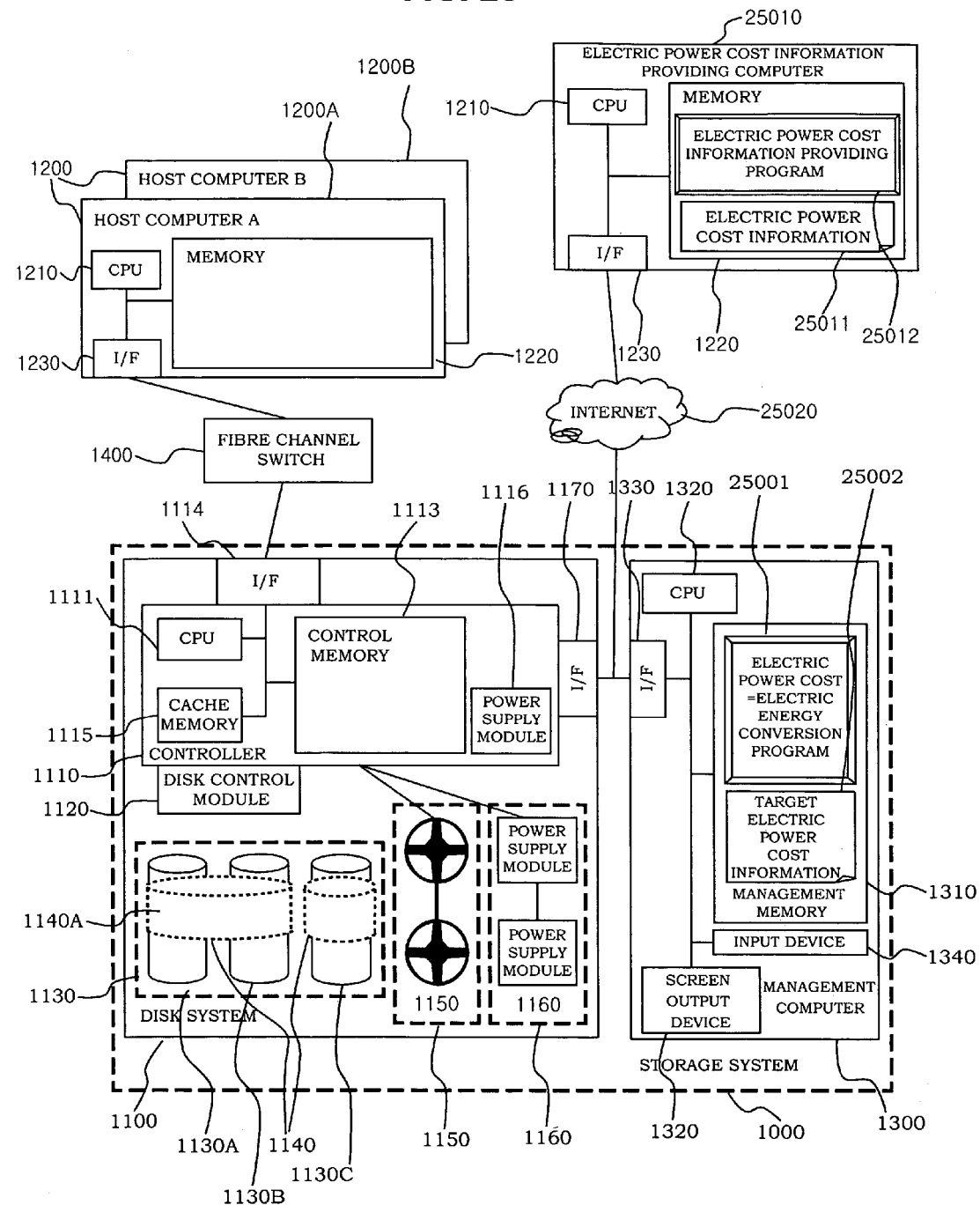
FIG. 25 shows an exemplary configuration of a system in a third embodiment.

FIG. 25 shows an exemplary configuration of a system to which a fourth embodiment is applied. Generally, a system manager calculates consumable electric power using the storage system 1000, on the basis of electric fees (hereinafter, referred to as "electric power cost") that are paid (can be paid) to an electric power company. Therefore, in the present embodiment, the manager sets information of the electric power cost in the storage system 1000, whereby the storage system 1000 automatically sets a target electric power commensurate to the electric power cost in the storage system 1000 itself. More specifically, on the basis of a target electric power cost input by the manager of the storage system 1000, the storage system 1000 converts the target electric power cost into a target electric power, using a conversion expression for the electric power provided by the electric power company and the electric power cost.

Here, the present embodiment is different from the first to third embodiments in that an electric power cost=electric energy conversion program 25001 and target electric power cost information 25002 are added to the management memory 1310 of the management computer 1300, and an electric power cost information providing computer 25010 is connected to the storage system 1000 over a network 25020.

The electric power cost information providing computer 25010 is a computer that provides information concerning an electric power cost (for example, an amount of money corresponding to electric energy used per unit time). An electric power cost information providing program 25012 and electric power cost information 25011 are stored in a memory in the electric power cost information providing computer 25010. It is conceivable that the electric power cost information providing computer 25010 is possessed by an electric power company. The electric power cost information 25011 is an entry with which electric power cost information required for calculating available electric power (that is, target electric power) from the electric power cost. As an example of the electric power cost, on the basis of conditions, such as electric power cost, time (or date), and electric power use contract, a function for calculating a maximum electric power which can meet the conditions is conceivable, but other methods may be adopted.

The electric power cost information providing program 25012 is a program that is executed by the electric power cost information providing computer 25010 when a whole or a portion of the electric power cost information is provided in response to a request from the management computer 1300.

Next, the outline of the programs and information added to the management computer 1300 will be described.

Target electric power cost information 25002 is an entry that stores information concerning a maximum electric power cost to be targeted by the storage system 1000. It is also conceivable that the information is input by the manager of the storage system 1000, but the information may be input by other methods or persons. The electric power cost=electric energy conversion program 25001 is a program executed when the management computer 1300 calculates and sets an available maximum electric power, on the basis of a maximum electric power cost to be targeted by the storage system 1000 and the information provided by the electric power cost information providing computer 25010.

In addition, as described above, the electric power cost information providing computer 25010 is connected to the storage system 1000 through the Internet 25020. In addition, the communication method and medium type of the Internet 25020 may not be considered.

FIG. 26 shows an exemplary processing sequence when the management computer 1300 executes the electric power cost=electric energy conversion program 25001 to calculate a target electric power from information concerning an electric power cost. It is assumed that the program is executed periodically, but the program may be executed at random times.

The management computer 1300 issues a request to the electric power cost information providing computer 25010 to acquire all or some of the electric power cost information. In addition, when the management computer 1300 issues a request to the electric power cost information providing computer 25010, it is necessary to know a position on a network, of the electric power cost information providing computer 25010 as an issuing destination. As a solving method, it is conceivable to input an address of the electric power cost information providing computer 25010 as a request issuing destination to the management computer 1300 in advance at a point of time of introduction of the storage system 1000. It should be noted here that other methods may be used. Further, the electric power cost information 25011 may be acquired by storing the information in advance in management computer 1300 or by cashing the information for a predetermined period of time. That is, the management computer acquires the information in advance or acquires the information as needed (Step 26000).

Next, the management computer 1300 confirms whether or not (A) target electric power cost information 25002 or (B) electric power cost information 25011 has changed (that is, it has been changed by a manager or an electric power company, etc.), and if the information is not changing, the management computer completes the processing (Step 26010). If the information is changing, the management computer 1300 calculates a target electric power from the target electric power cost information, using a calculating expression included in the electric power cost information (Step 26020).

Next, if the calculated target electric power is equal to a conventional target electric power, the management computer 1300 completes the execution of the program (Step 26030). If not, the management computer 1300 compares the calculated target electric power with a currently used electric power acquired from the disk system 1100 (Step 26040). If the calculated value is small, the management computer 1300 displays on a screen output device, a message that the target electric power cannot be set because the currently used electric power is greater, and completes the processing (Step 26060). Meanwhile, in Step 26040, if the calculated value is greater than the currently used electric power, the management computer 1300 updates the target electric power of the disk system 1100 to the calculated value and completes execution of the program (Step 26050).

In addition, it has been described in the above embodiments that the disk device 1130 is started-at the time of reception of the notification of a rise in availability of a logical volume that is notified from the host computer, etc. However, the disk device may be started at other time. Further, an example in which rises in the usability of a logical volume are determined as host computers analyze patterns of access to the logical volume is considered.

In addition, as embodiments of the invention, the following configurations are also considered. Specifically, an information system includes a host computer and a disk system. The host computer has a function to access to a logical volume defined in the disk system. The disk system has at least one disk device and a power supply module, and has a function to convert the logical volume to the disk device.

The host computer has a unit that notifies the disk system of a logical volume whose possibility to be accessed in the future has been improved. The disk system has a unit that starts a disk device corresponding to the logical volume by comparing the electric power capacity of the power supply module with an electric power consumed by a disk device to be newly started in addition to a disk device that is being currently started.

Further, in the above configuration, it is conceivable to adopt a configuration in which the disk system further includes at least one fan, and the disk system has a unit that starts a disk device corresponding to the logical volume by comparing a cooling heat quantity of the fan with a calorific power of the disk device to be newly started in addition to the, disk device which is being started.

Moreover, in the above configuration, it is also conceivable to adopt a configuration in which, when the disk device corresponding to the logical volume is started, the disk system further includes a unit that recognizes a fan required to be newly started, to start the fan.

Further, in the above configuration, the host computer may have a unit that notifies the disk system of a logical volume whose possibility to be accessed in the future has been lowered, and the disk system may have a unit that recognizes a disk device corresponding to the logical volume, to stop the disk device.

Moreover, in addition to the above configuration, it is also conceivable to adopt a configuration in which the disk system further includes a unit that recognizes a fan to be newly started when the disk device corresponding to the logical volume is stopped, to stop the fan.

Further, as another configuration, it is also conceivable to adopt the following configuration. Specifically, an information system includes a host computer and a disk system. The host computer accesses to a host logical volume. The disk system has at least one disk device and a power supply module, and has a function to convert the host logical volume and the logical volume, and a function to convert the logical volume to the disk device. The host computer has a unit that notifies the disk system of a logical volume whose possibility to be accessed in the future has been improved. The disk system has a unit that starts a disk device corresponding to the logical volume by comparing the electric power capacity of the power supply module with an electric power consumed by a disk device to be newly started in addition to a disk device that is being currently started.

Moreover, in the above configuration, it is also conceivable to adopt a configuration in which the disk system further includes at least one fan, and the disk system has a unit that starts a disk device corresponding to the logical volume by comparing a cooling heat quantity of the fan with a calorific power of the disk device to be newly started in addition to the disk device which is being started.

Further, in the above configuration, it is also conceivable to adopt a configuration in which, when the disk device corresponding to the logical volume is started, the disk system further includes a unit that recognizes a fan required to be newly started, to start the fan.

Moreover, in the above configuration, the host computer may have a unit that notifies the disk system of a logical volume whose possibility to be accessed in the future has been lowered, and when host logical volume allocated to the logical volume is opened, the disk system may have a unit that stops a disk device corresponding to the logical volume.

Moreover, in the above configuration, it is also conceivable to adopt a configuration in which the disk system further includes a unit that recognizes a fan to be newly stopped when the disk device corresponding to the logical volume is stopped, to stop the fan.

Further, as a different configuration, it is also conceivable to adopt a disk system including an NAS having information that acquires a logical volume including data of a file from a file name or an identifier, at least one disk device, a power supply module, and a controller having a function to converting the logical volume to the disk device. When the NAS has received a file open request from the controller, the NAS has a unit that determines that the accessibility of the logical volume has been improved, on the basis of the file open request, and that notifies the fact. The disk system has a unit that starts a disk device corresponding to the logical volume by comparing the electric power capacity of the power supply module with an electric power consumed by a disk device to be newly started in addition to a disk device that is being currently started.

Moreover, in the above configuration, it is also conceivable to adopt a configuration in which the disk system further includes at least one fan, and the disk system has a unit that starts a disk device corresponding to the logical volume by comparing a cooling heat quantity of the fan with a calorific power of the disk device to be newly started in addition to the disk device which is being started.

Further, in the above configuration, it is also conceivable to adopt a configuration in which, when the disk device corresponding to the logical volume is started, the disk system further includes a unit that recognizes a fan required to be newly started, to start the fan.

Further, in the above configuration, it is also conceivable to adopt a configuration in which the NAS has a unit that determines that the accessibility of the logical volume has been lowered, when the NAS has received a file close request from the controller, on the basis of the file close request, and notifies the fact, and the disk system has a unit that stops a disk device corresponding the logical volume.

Alternatively, in the above configuration, it is also conceivable to adopt a configuration in which the disk system further includes a unit that recognizes a fan to be newly stopped when the disk device corresponding to the logical volume is stopped, to stop the fan.

What is claimed is:

1. A storage system comprising:
   a controller;
   a disk device connected to the controller;
   a cooling device that cools the disk device; and
   a power supply module that supplies electric power to the controller, the disk device, and the cooling device,
   wherein the controller determines whether or not the disk device is to be started, on the basis of information concerning heat quantity generated by starting the disk device, the cooling capacity of the cooling device, and electric power required to drive the disk device.

2. A storage system according to claim 1,
   wherein the controller also considers information concerning electric power required to drive the cooling device when it determines whether or not the disk device is to be started.

3. A storage system according to claim 2, wherein the controller creates a logical volume that is a storage region on the basis of a storage region in the disk device, wherein the controller is connected to a computer, and wherein the controller determines whether or not the disk device is to be started, when the logical volume is used by the computer.

4. A storage system according to claim 3,
   wherein the controller determines whether or not the cooling device is to be stopped, on the basis of information concerning heat quantity that is reduced by stopping the disk device.

5. A storage system according to claim 3,
wherein the cooling device is a fan,
wherein the controller decreases the number of rotations of the fan, on the basis of the information concerning heat quantity that is reduced by stopping the disk device.

6. A storage system according to claim 3,
wherein the controller determines whether or not the disk device corresponding to the logical volume is to be stopped, when the logical volume is no longer used by the computer.

7. A storage system according to claim 1, further comprising:
information concerning a predetermined threshold value about electric power,
wherein the controller determines whether or not the disk device is to be started, on the basis of whether or not an electric power consumed by the storage system by driving the disk device exceeds the predetermined threshold value.

8. A storage system according to claim 7,
wherein the threshold value is the maximum electric power of the power supply module.

9. A storage system according to claim 7,
wherein the threshold value is a value to be set by a user who uses the storage system.

10. A storage system according to claim 9,
wherein the controller further determines whether or not driving of the cooling device is necessary.

11. A storage system according to claim 10,
wherein if there is any cooling device required to be driven by driving the disk device, the controller determines whether or not the disk device and the cooling device is to be driven, on the basis of whether or not an electric power consumed by the storage system by driving the disk device and the cooling device exceeds the predetermined threshold value.

12. A storage system according to claim 11,
wherein the controller changes information concerning determination on whether or not the disk device is to be driven, on the basis of a change in the cooling capacity of the cooling device.

13. A storage system according to claim 12,
wherein the change in the cooling capacity of the cooling device is a change based on opening/closing of a cover in a housing that contains the storage system.

14. A storage system according to claim 13,
wherein the controller determines whether or not the disk device is to be started, when the logical volume is mounted on the computer.

15. A storage system according to claim 14,
wherein the controller determines whether or not the disk device is to be stopped, when the logical volume is unmounted from the computer.

16. A storage system according to claim 15,
wherein the controller determines whether or not the disk device is to be started, when an open command of a file stored in the logical volume is transmitted from the computer.

17. A storage system according to claim 16,
wherein the controller determines whether or not the disk device is to be started, when a close command of a file stored in the logical volume is transmitted from the computer.

18. A storage system according to claim 11,
wherein the controller monitors a failure of a device in the storage system, and
when the failure occurs, the controller changes information concerning determination on whether or not the disk device is to be driven.

* * * * *